(12) United States Patent
Sharma et al.

(10) Patent No.: US 8,015,368 B2
(45) Date of Patent: Sep. 6, 2011

(54) PROCESSOR EXTENSIONS FOR ACCELERATING SPECTRAL BAND REPLICATION

(75) Inventors: Sridhar Sharma, Milpitas, CA (US); Binuraj Ravindran, Cupertino, CA (US); Jeffrey V. Hill, San Jose, CA (US)

(73) Assignee: Siport, Inc., Santa Clara, CA (US)

( * ) Notice: Subject to any disclaimer, the term of this patent is extended or adjusted under 35 U.S.C. 154(b) by 450 days.

(21) Appl. No.: 12/148,747

(22) Filed: Apr. 21, 2008

(65) Prior Publication Data

US 2008/0263285 A1    Oct. 23, 2008

Related U.S. Application Data

(60) Provisional application No. 60/925,453, filed on Apr. 20, 2007.

(51) Int. Cl.
*G06F 12/00* (2006.01)
(52) U.S. Cl. ........... 711/147; 712/28; 708/300; 704/500
(58) Field of Classification Search .................. 711/147; 712/28; 708/300; 704/500
See application file for complete search history.

(56) References Cited

U.S. PATENT DOCUMENTS

| | | | |
|---|---|---|---|
| 4,761,644 A | 8/1988 | Kawai et al. | |
| 5,140,698 A | 8/1992 | Toko | |
| 5,155,479 A | 10/1992 | Ragan | |
| 5,325,088 A | 6/1994 | Willard et al. | |
| 5,555,183 A | 9/1996 | Willard et al. | |
| 5,654,952 A * | 8/1997 | Suzuki et al. | 369/59.16 |
| 6,205,225 B1 | 3/2001 | Orban | |
| 6,219,333 B1 | 4/2001 | Ahn | |
| 6,317,065 B1 | 11/2001 | Raleigh | |
| 6,438,364 B1 | 8/2002 | Waite | |
| 6,466,913 B1 * | 10/2002 | Yasuda et al. | 704/500 |
| 6,763,240 B1 | 7/2004 | Chambers | |
| 7,006,617 B1 | 2/2006 | Dal Farro | |
| 7,299,021 B2 | 11/2007 | Pärssinen | |
| 7,369,989 B2 * | 5/2008 | Absar et al. | 704/203 |
| 7,480,689 B2 * | 1/2009 | Song | 708/300 |
| 7,512,743 B2 * | 3/2009 | Tom et al. | 711/146 |
| 2002/0126778 A1 | 9/2002 | Ojard | |
| 2003/0159076 A1 | 8/2003 | Delisle | |
| 2004/0223449 A1 | 11/2004 | Tsuie et al. | |
| 2005/0047488 A1 | 3/2005 | Sugahara | |
| 2006/0112157 A1 * | 5/2006 | Song | 708/300 |
| 2006/0195498 A1 * | 8/2006 | Dobbek et al. | 708/300 |
| 2006/0212503 A1 * | 9/2006 | Beckmann et al. | 708/300 |
| 2007/0112901 A1 * | 5/2007 | Niktash et al. | 708/300 |
| 2008/0097764 A1 * | 4/2008 | Grill et al. | 704/500 |
| 2009/0198753 A1 * | 8/2009 | Benjelloun Touimi | 708/313 |

\* cited by examiner

*Primary Examiner* — Stephen C Elmore
(74) *Attorney, Agent, or Firm* — Carr & Ferrell LLP

(57) ABSTRACT

Enhancements to hardware architectures (e.g., a RISC processor or a DSP processor) to accelerate spectral band replication (SBR) processing are described. In some embodiments, instruction extensions configure a reconfigurable processor to accelerat SBR and other audio processing. In addition to the instruction extensions, execution units (e.g., multiplication and accumulation units (MACs)) may operate in parallel to reduce the number of audio processing cycles. Performance may be further enhanced through the use of source and destination units which are configured to work with the execution units and quickly fetch and store source and destination operands.

32 Claims, 16 Drawing Sheets

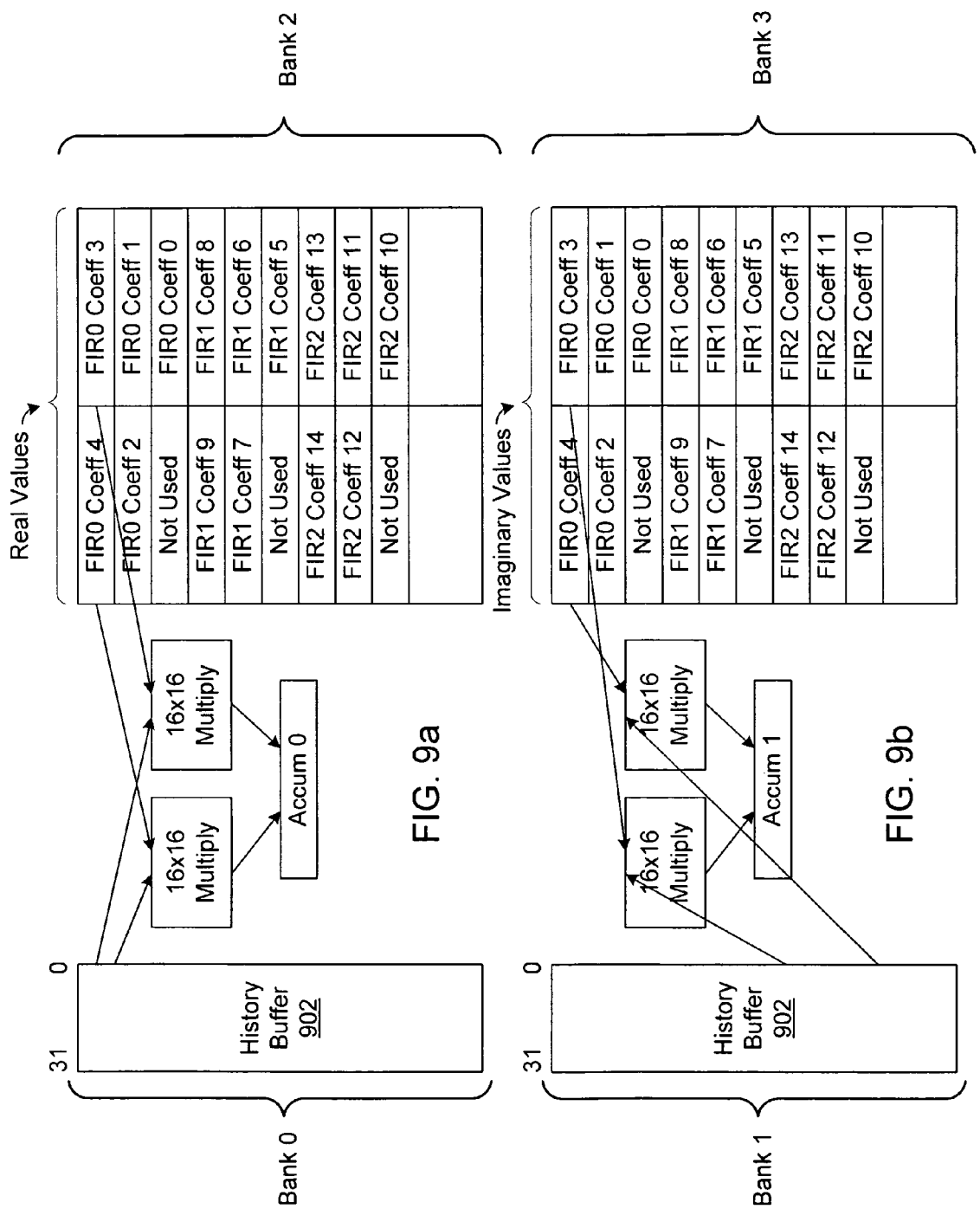

PROCESSOR EXTENSIONS FOR ACCELERATING SPECTRAL BAND REPLICATION

CROSS-REFERENCE TO RELATED APPLICATIONS

This application claims the benefit of U.S. provision patent application No. 60/925,453, filed Apr. 20, 2007, and entitled "Processor Extensions for Accelerating Spectral Band Replication and Parametric Stereo," which is incorporated herein by reference.

BACKGROUND OF THE INVENTION

1. Field of the Invention

Embodiments of the present invention relate generally to processor extensions and, more particularly, to processor extensions for accelerating a spectral band replication.

2. Background Art

Low bitrate audio coding using conventional perceptual audio codecs is not possible without significant degradation of audio quality. Spectral Band Replication (SBR) is a high frequency reconstruction technique that improves the quality of low bitrate audio. SBR also improves the performance of narrow band speech codecs by improving speech quality, speech intelligibility and speech comprehension.

In SBR, high frequency components of an audio signal are coded in an efficient manner. The conventional perceptual audio codec is responsible for coding the lower part of the spectrum. Guidance information (i.e., SBR data) regarding the high frequency components of the audio signal and the coded low frequency components are transmitted. An SBR decoder at the receiver regenerates the higher frequencies based on the guidance information and an analysis of the lower frequencies transmitted in the underlying coder. Subsequently, the SBR decoder regenerates the audio signal by synthesizing the low and high frequency components.

SBR is efficient for harmonic or noise-like components and allows for proper shaping in the time domain as well as in the frequency domain. As a result, SBR allows full bandwidth audio coding at very low data rates, thus offering a significantly increased compression efficiency compared to the core coder.

Unfortunately, the process of SBR decoding in the prior art to regenerate the audio signal can be computationally expensive and results in increased computational complexity of the decoder. The increase in computational complexity results in increased power dissipation which can be a particular problem in mobile platforms.

SUMMARY OF THE INVENTION

Embodiments of the present invention provide exemplary systems and methods for accelerating spectral band replication with shared memory. In some embodiments, the memory is shared with hardware extensions and an reconfigurable processor. In other embodiments, the memory is shared with a processor and an audio coprocessor.

An exemplary system comprises a reconfigurable processor, multiple execution units, a source control unit, and a destination control unit. The reconfigurable processor may be configured to receive an instruction extension to accelerate a variety of audio processing functions. A first execution unit of the plurality of execution units may be configured to assist the reconfigurable processor in audio processing. Another execution unit may be configured to perform in parallel with the first execution unit. The source control unit may be configured to fetch source operands for the execution units. Further, the destination control unit may be configured to store values from the operation.

BRIEF DESCRIPTION OF THE DRAWINGS

FIG. 9a and FIG. 9b are tables displaying memory usage regarding complex values from the QMF analysis module in exemplary embodiments.

DETAILED DESCRIPTION OF EXEMPLARY EMBODIMENTS

Enhancements to hardware architectures (e.g., a RISC processor or a DSP processor) to accelerate spectral band replication (SBR) processing are described. In some embodiments, instruction extensions are added to a reconfigurable processor to accelerate SBR and other audio processing. These instruction extensions may sequence the operation of multiple execution units (e.g., multiplication and accumulation units (MACs)) in parallel to reduce the number of audio processing cycles. Performance may be further enhanced through the use of source and destination units which are configured to, respectively, fetch operands efficiently to the execution units and write out the results from the execution units.

In some embodiments, memory may be shared between a core processor and an audio coprocessor to perform SBR processing. In other embodiments, memory may be shared between a core processor and hardware extensions including MAC units. By utilizing parallelism through the use of shared memory (such as shared registers or other forms of shared memory), SBR processing may be performed more efficiently (e.g., in fewer cycles which allows the processor to be clocked at a lower frequency). Further, the instruction extensions, execution units, source and destination units, and shared memory can be used to accelerate other types of audio processing such as parametric stereo and equalization.

Figure 1:
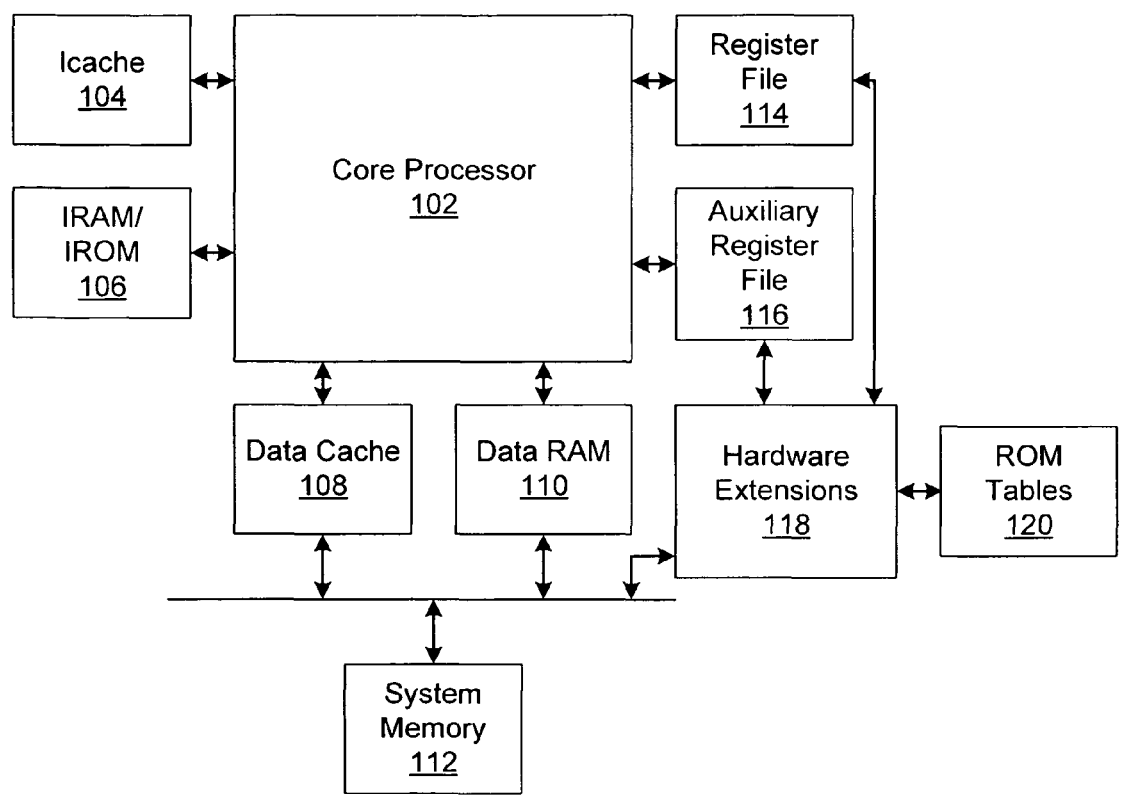
FIG. 1 is a block diagram of an exemplary system with hardware extensions in an embodiment of the present invention.

FIG. 1 is a block diagram of an exemplary system with hardware extensions in an embodiment of the present invention. The system comprises a core processor 102 and hardware extensions 118. The core processor 102 is coupled to an Icache 104 and an IRAM/IROM 106. The core processor 102, among other functions, processes audio data and, in various embodiments, SBR data (i.e., guidance information regarding higher frequency components of audio data), which are received from system memory 112 via a data cache 108 and/or data RAM 110. The hardware extensions 118 and core processor 102 are configured to communicate with a shared register file 114 and the auxiliary register file 116. The hardware extensions 118 are further in communication with the ROM tables 120.

In one example, the system depicted in FIG. 1 is a receiver or part of a receiver that is configured to receive encoded audio. The core processor 102 and the hardware extensions 118 may be configured to take advantage of instruction extensions, shared registers (e.g., the register file 114 and/or the auxiliary register file 116), execution units that can perform functions in parallel (e.g., for performing SBR techniques).

The Icache 104 is a cache that is configured to work with instruction memory (e.g., IRAM/IROM 106) and the core processor 102 to increase instruction management efficiency. The IRAM/IROM 106 is memory for instructions to be processed by the core processor 102. The IRAM/IROM 106 may be any kind of memory.

The core processor 102 may receive a coded audio signal and SBR data from the system memory 112. In various embodiments, the core processor 102 is a reconfigurable RISC processor, such as Tensilica or ARC. It will be appreciated by those skilled in the art that the core processor 102 may be any kind of processor (or multiple processors) that is reconfigurable by extension instructions. In some embodiments, the core processor 102 is a reconfigurable processor that may receive instruction extensions of, for example, fast Fourier transforms and discrete cosine transforms, to accelerated audio processing (e.g., SBR, parameter stereo, equalization, and/or audio post-processing).

The system memory 112 may be any kind of memory configured to receive data. In one example, the system memory 112 receives coded audio data and SBR data from a transmitter via an antenna (not depicted). The data cache 108 and data RAM 110 are a cache and ram, respectively, configured to assist the core processor 102 to receive the coded audio data and SBR data and/or help the core processor 102 to perform efficiently.

Perceptual audio codecs in general, and SBR and parametric stereo specifically, are very data-intensive by nature. In addition to performing complex mathematical operations, a significant part of the processing is copying large blocks of data from one memory segment to another. These memory accesses can be very time-consuming; memory-access-time can depend on dynamics of the memory-access by other hardware blocks to the memory in the overall system. As a result, closely-coupled-memory can improve data access. Similarly, having a closely-coupled-instruction memory may also make computationally-intensive modules run more efficiently. One example is IRAM/IROM 106 (closely coupled instruction RAM) and Data RAM 110 (closely coupled Data RAM). The optimal size of the closely-coupled-instruction memory and closely-coupled-data memory can vary depending on the processing requirements and cost aspects of a particular application. In various embodiments, the size of the different memory blocks can be selected based on the memory-configuration register. This may be helpful in implementations that are used for multiple applications. The closely coupled and system memory sizes can be dynamically adjusted based on the application.

The register file 114 and the auxiliary register file 116 include registers that are shared between the core processor 102 and the hardware extensions 118. Those skilled in the art will appreciate that there may be any number of register files and/or memory shared between the core processor 102 and the hardware extensions 118. In one example, there may be a single shared register file shared by both the core processor 102 and the hardware extensions 118. Shared registers in the register file 114, the auxiliary register file 116, or both, may be used to invoke parallelism to increase processing efficiency.

The register file 114 may comprise four banks of memory which are 32 bits wide. Those skilled in the art will appreciate that the memory banks may be allocated differently depending on the hardware reference. For example, from the core processor 102 view point, the four banks of 32 bits may be viewed as memory that is 64 bits wide. In various embodiments, the sharing of memory between the core processor 102 and the hardware extensions 118 allow for parallelism. In an example, the four locations (i.e., the four banks) may be accessed in the same cycle which allows for four read/write accesses per cycle. The access to the memory (e.g., the auxiliary register file 116) may be controlled by source and destination control units (not depicted). The reduction of cycles for performing tasks may significantly increase the speed of audio processing.

In various embodiments, a source control register within the source control unit controls fetching of source operands while a destination control register within the destination control unit routes a result of the instruction to the destination. The source and destination control registers may reside in the auxiliary register file 116, the register file 114, system memory 112, private registers (i.e., registers that are not shared by both the core processor 102 and the hardware extensions 118) or elsewhere. This is different from the standard paradigm of a RISC processor where there are 2 source operands and 1 destination operand. These operands may be fetched from the processor's register file. The flexibility of the source and destination controllers can increase throughput.

The source and destination control units may support multiple addressing modes such as linear, bit reversed, or modulo. The units may also support auto increment by a fixed offset as well as a mode where one or both units pass one or more operands specified by an instruction. In some embodiments, the source and destination control units are within the hardware extensions 118.

In various embodiments, either the source control unit or the destination control unit (or both) include a programmable shift register which may be used for pre-scaling and post-scaling. Those skilled in the art will appreciate that there may also be special purpose units that index the ROM tables 120 (described herein).

The auxiliary register file 116 is shared by the core processor 102 and the hardware extensions 118. The auxiliary register file 116 may be 64×32 which can also be viewed as 128×16. The auxiliary register file 116 may be configured to have six read ports and four write ports. In one example, the auxiliary register file 116 is accessed by the source and destination control units.

The hardware extensions 118 allow the reconfigurable core processor 102 to be extended by adding instructions that may accelerate SBR processing as well as other functions (e.g., parametric stereo). The hardware extensions 118 may include four MAC units (multiply-accumulate units) which may access shared memory (e.g., register file 114), and a register file (e.g., auxiliary register file 116). The MAC units may be configured to perform integer or fractional arithmetic. In one example, the multipliers may be configured to be 32×16 and 16×16. The MAC units may also have a throughput of a multiply result every cycle. Optionally, the MAC units may be configured to perform a 32×32 multiplication with a throughput result every two cycles. Although four MAC units are discussed with regard to FIG. 1, the hardware extensions 118 may include any number of MAC units.

The hardware extensions 118 may also comprise two source control units and two destination control units to control access to the shared memory and register file to obtain source for instructions and write the result. Those skilled in the art will appreciate that there may be any number of source control units and destination control units.

The ROM tables 120 are coupled to the hardware extensions 118. In various embodiments, there are sine; cosine, sine window, and Kaiser Bessel derived window tables within the ROM tables 120. The sine and cosine entry tables can be combined to give $e^{jx}$ and $e^{-jx}$ values. In one example, the ROM tables 120 include a single table with 256 entries corresponding to Π/2. Further, other values can be derived from this quadrant of values. The table may also be used when coarser steps are required. For example, the ROM tables 120 may be used in the computation of a fast Fourier transform (FFT), a Discrete Cosine Transform (DCT), and/or an Inverse Modified Discrete Cosine Transform (IMDCT).

Figure 2:
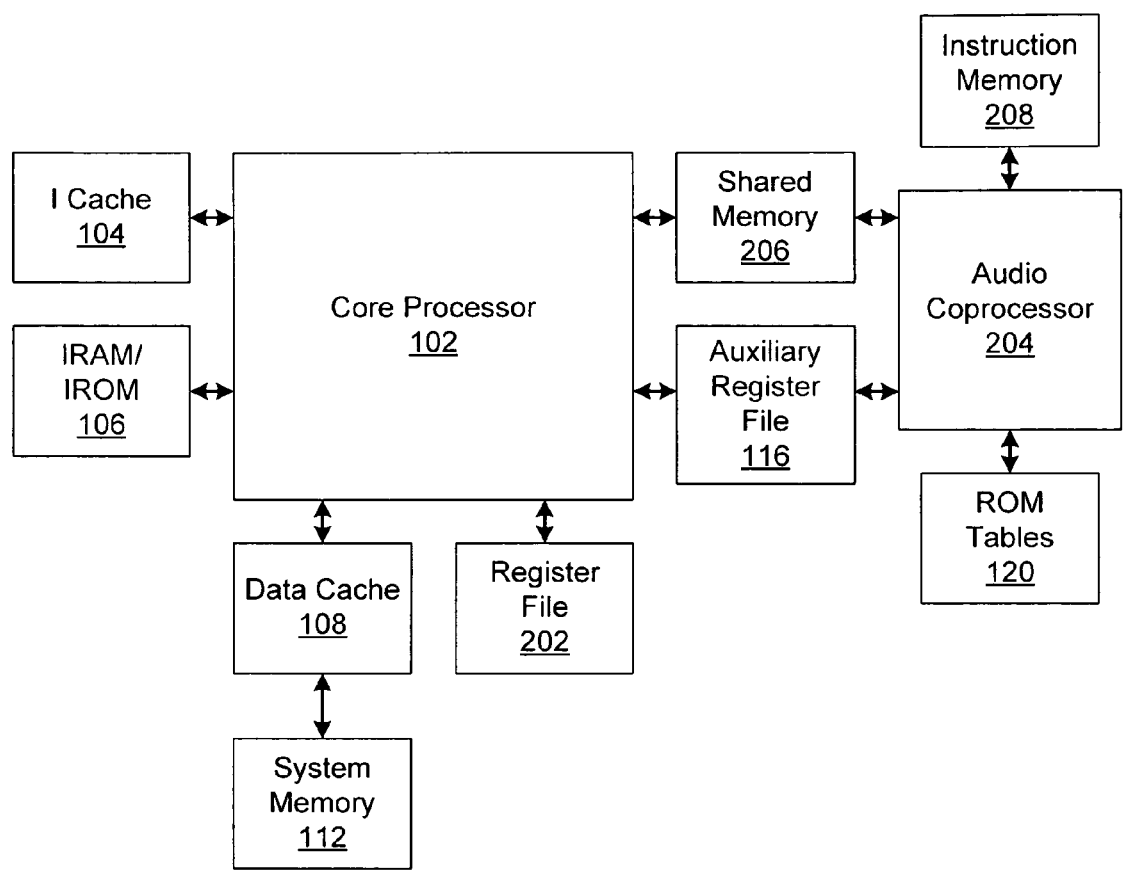
FIG. 2 is another block diagram of an exemplary system with a coprocessor in an embodiment of the present invention.

FIG. 2 is another block diagram of an exemplary system with a coprocessor in an embodiment of the present invention. In FIG. 2 hardware accelerators communicate with the core processor 102 through shared memory rather than the processor instruction extension as described in FIG. 1. In some embodiments, the core processor 102, as depicted in FIG. 2, may comprise one or more processors and may or may not be reconfigurable.

The register file 202 is a register file that, unlike FIG. 1, is not shared but is rather dedicated to the core processor 102. The audio coprocessor 204 is configured as a hardware accelerator that takes the place of or, in some embodiments, assists processing in conjunction with, hardware extensions.

The shared memory 206 is any memory that is shared between the core processor 102 and the audio coprocessor 204. In one example, the shared memory 206 comprises registers or any kind of memory. The shared memory 206 may, in some embodiments, have a similar hardware configuration as register file 114.

Instruction memory 208 is memory (such as IRAM/IROM and, optionally, an Icache) to assist the audio coprocessor 204 in processing instructions (e.g., instructions related to the QMF analysis and/or the QMF synthesis). In various embodiments, instruction memory 208 may include, but is not limited to, IRAM (closely coupled instruction RAM) and/or data RAM (closely coupled data RAM).

There are many different types of coprocessor configurations. In some embodiments, the audio coprocessor 204 does not fetch instructions from memory but depends on the core processor 102 to fetch the audio coprocessor 204 instructions and handle all other operations aside from the coprocessor functions. In one example, the audio coprocessor 204 handles instructions such as FFT butterfly, DCT twiddle, etc., but the instruction flow for a FFT or DCT pre- and post-twiddle may be handled by the core processor 102 (e.g., with instruction extensions). The data is shared between the core processor 102 and the audio coprocessor 204 via shared memory (e.g., shared memory 206) and registers (e.g., auxiliary register file 116). In other configurations, a coprocessor is a more general-purpose processor, but carries out only a limited range of functions under the close control of a supervisory core processor 102. In this case, the audio coprocessor 204 can be used to accelerate certain functions such as FIR filter, DCT3, DCT2, etc.

Figure 3:
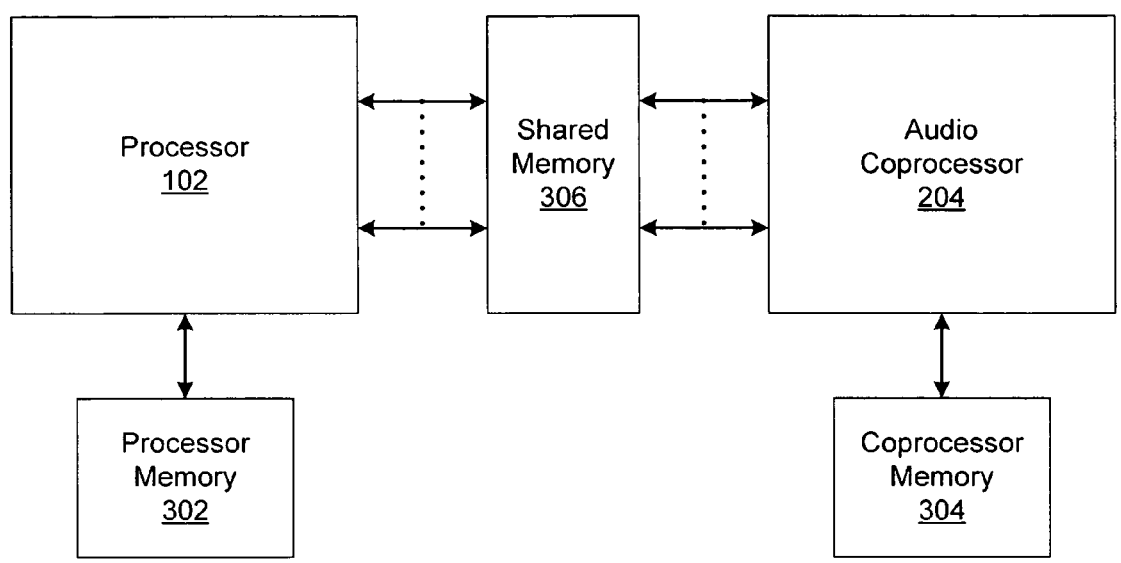
FIG. 3 is a block diagram of generalized hardware architecture in an embodiment of the present invention.

Those skilled in the art will appreciate that the exemplary hardware architecture described with regard to FIGS. 1 and 2 can be generalized. FIG. 3 is a block diagram of exemplary generalized hardware architecture in an embodiment of the present invention. The processor 102 and the audio coprocessor 204 share shared memory 306. Shared memory 306 may include shared memory 206 (see FIG. 2), the auxiliary register file 116 (see FIG. 2), the register file 114 (see FIG. 1), other memory, or a combination of these.

Processor memory 302 is dedicated memory coupled to the processor 102 that may include processor data and instructions. Coprocessor memory 304 is a dedicated memory coupled to the audio coprocessor 204 that may include coprocessor data and instructions. In one example, the processor memory 302 and/or the coprocessor memory 304 may include, but is not limited to, IRAM (closely coupled instruction RAM) and/or data RAM (closely coupled data RAM). Those skilled in the art will appreciate that the dedicated memory (i.e., the processor memory 302 and the coprocessor memory 304) may include ROMs and/or registers.

The shared memory 306 may include N memory banks where each of the banks has from 1 to M ports. In exemplary embodiments, the shared memory 306 includes four banks of single port shared memory and the multi-port auxiliary register file. Further, shared memory 306 can be synchronous or synchronous.

Execution units (e.g., source and destination control units described herein and/or MAC units) correspond to multiplication and accumulation units. For example, where instruction extensions are implemented, the execution units may be sequenced by the processor. The executions units may have the ability to fetch operands from shared and dedicated memory.

Figure 4:
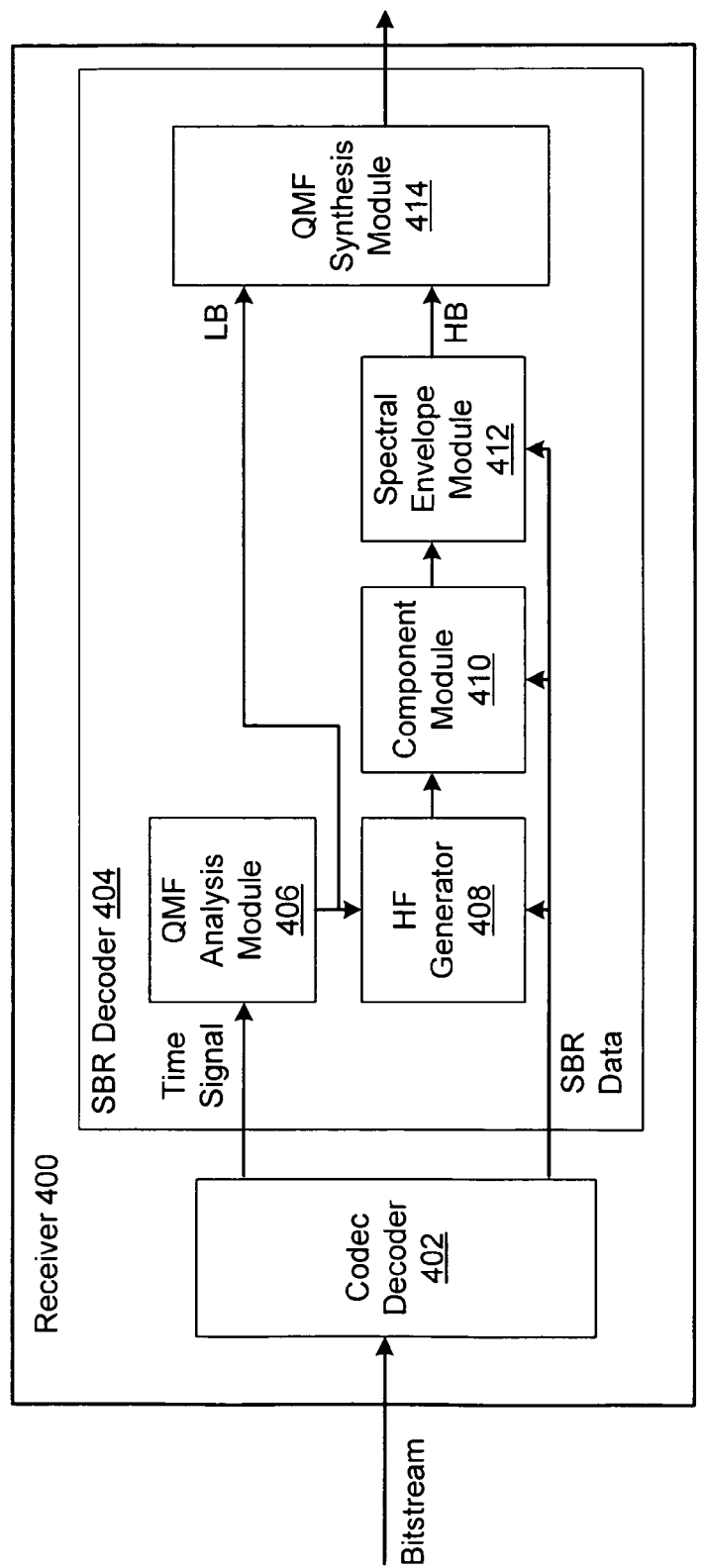
FIG. 4 is a block diagram of an exemplary receiver in an embodiment of the present invention.

FIG. 4 is a block diagram of an exemplary receiver 400 in an embodiment of the present invention. The receiver 400 comprises a codec decoder 402 and an SBR decoder 404. Those skilled in the art will appreciate that the receiver may have any number of other devices beyond the codec decoder 402 and the SBR decoder 404.

The codec decoder 402 receives the encoded bitstream from a transmitter (not depicted). The codec decoder 402 provides a low frequency signal and the SBR data to the SBR decoder 404. The codec decoder 402 may include, but is not limited to, an Inverse Modified Discrete Cosine Transform (IMDCT) filter or a different filter bank (e.g., MP3). The SBR decoder 404 comprises a QMF analysis module 406, an high frequency (HF) generator 408, a component module 410, a spectral envelope module 412, and a QMF synthesis module 414.

In various embodiments, the low frequency signal from the codec decoder 402 is analyzed with a 32-channel analyzing AQMF bank (AQMF) within the QMF analysis module 406. The HF generator 408 reconstructs the high frequency components by patching the low frequency complex valued subband signals from the QMF analysis module 406 based, at least in part, on the low frequency signal and the SBR data from the codec decoder 402. The component module 410 inversely filters the reconstructed high band from the HF generator 408 based on control parameters in the bitstream within the SBR data. The spectral envelope module 412 modifies the spectral envelope of the reconstructed high band from the component module 410 and injects additional sinusoids and noise. Optionally, a detector and reducer (not depicted in FIG. 4) may be used to reduce aliasing. The QMF synthesis module 414 synthesizes the low band time domain audio samples (low frequency signal) from the QMF analysis module 406 and the high band time domain audio samples from the spectral envelope module 412.

The QMF analysis module 406 and the QMF Synthesis module 414 can be very computationally expensive. However, an efficient implementation may be used to reduce the MIPS and, hence, power. The QMF analysis module 406 and the QMF synthesis module 414 comprise QMF filters. The QMF filters (analysis $h_k(n)$ and synthesis $f_k(n)$) may be obtained by complex modulation of a lowpass prototype filter $p_0(n)$.

$$h_k(n) = p_0(n)e^{i\frac{\pi}{2M}(2k+1)\left(n-\frac{N}{2}-\frac{M}{2}\right)}, \quad \begin{array}{l} k = 0 \ldots M-1 \\ n = 0 \ldots N \end{array}$$

$$f_k(n) = p_0(n)e^{i\frac{\pi}{2M}(2k+1)\left(n-\frac{N}{2}+\frac{M}{2}\right)}, \quad \begin{array}{l} k = 0 \ldots M-1 \\ n = 0 \ldots N \end{array}$$

Where M is the number of channels and N is the prototype filter order. In the exemplary case of AAC Plus codec, M=32 and N=5.

In one example, the input to the QMF analysis filter ($h_k(n)$) is a signal with a real value and the output to the QMF analysis filter is a set of sub-band signals with complex values where the real and imaginary parts are Hilbert transforms of each other. For an input signal of x, the output signal y can be shown to be:

$$Y_k(z) = H_k(z)X(z) = \sum_{l=0}^{2M-1} U_l(z)e^{i\frac{\pi}{2M}(2k+1)\left(l\frac{N}{2}-\frac{M}{2}\right)}$$

where $$U_l(z) = G_l(-z^{2M})z^{-1}X(z)$$

Figure 5:
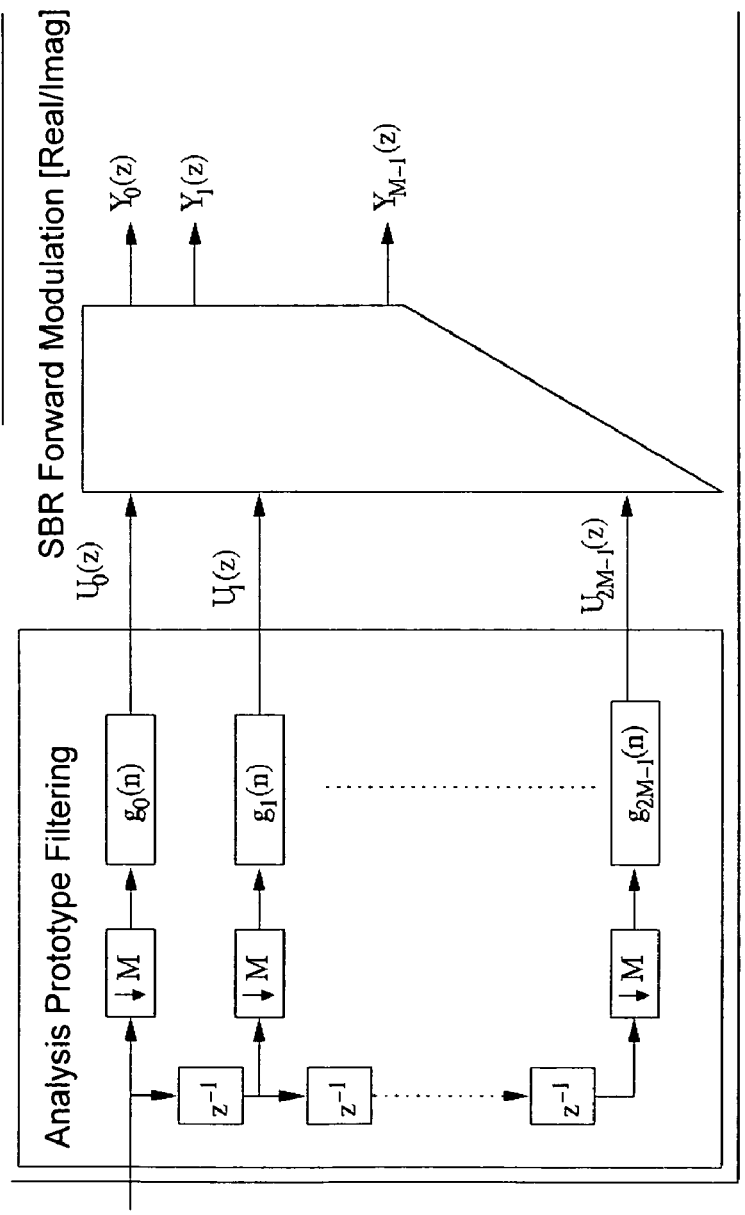
FIG. 5 is a graphical representation of the signal input and signal output to a QMF analysis filter in an embodiment of the present invention.

FIG. 5 is a graphical representation of the signal input and signal output to a QMF analysis filter in an embodiment of the present invention.

It can also be shown the output:

$$Y = T\{C^{IV}[u_1 - Ju_2] + iS^{IV}[u_1 + Ju_2]\}$$

where $C^{IV}$ and $S^{IV}$ are DCT (discrete cosine transform) and DST (discrete sine transform) type IV matrices of size M×M, u is the filtered input signal, and T (i.e., timeIn—see FIG. 6) is the twiddle factor.

Figure 6:
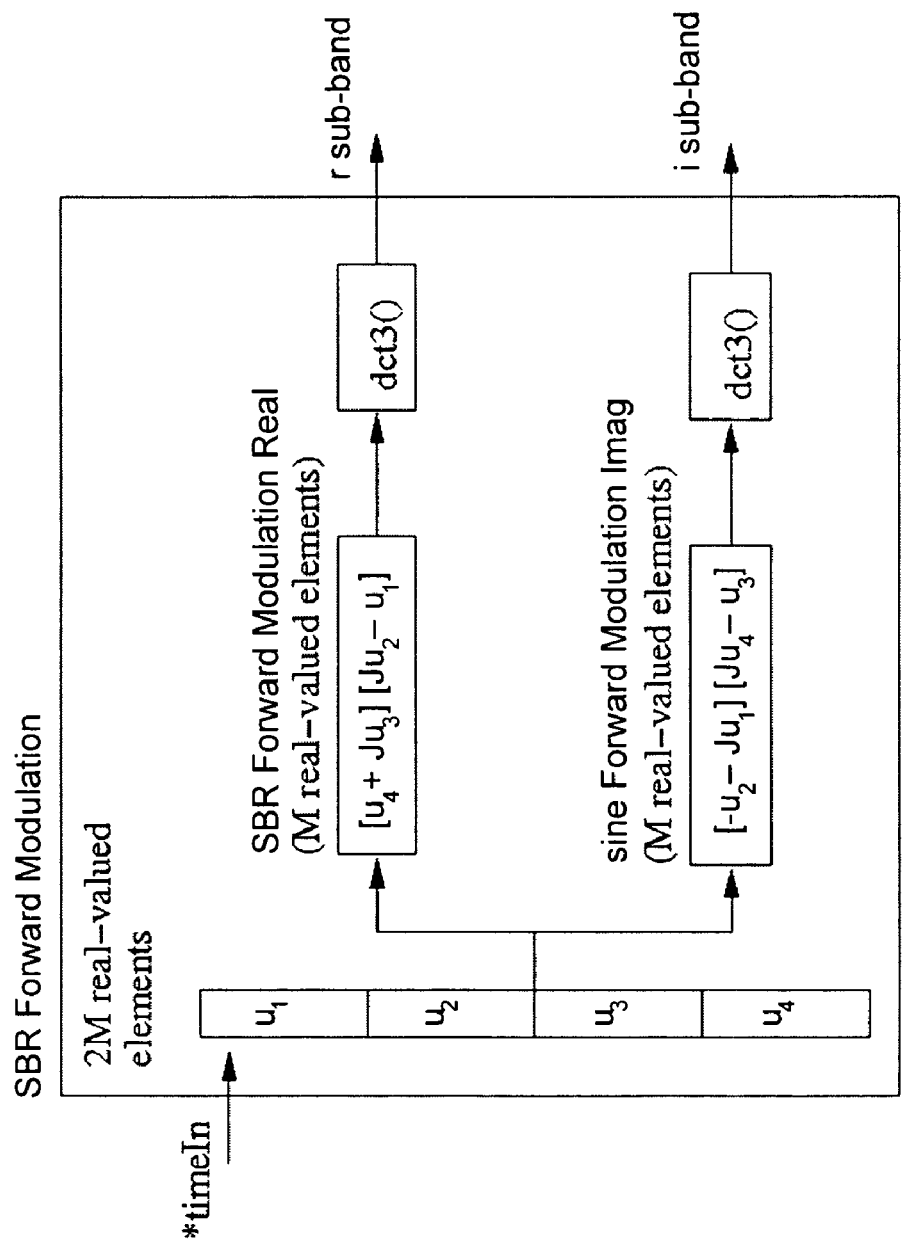
FIG. 6 is a graphical representation of the QMF analysis filter using the relationship between DCT3 and DCT4 in an embodiment of the present invention.
Figure 7:
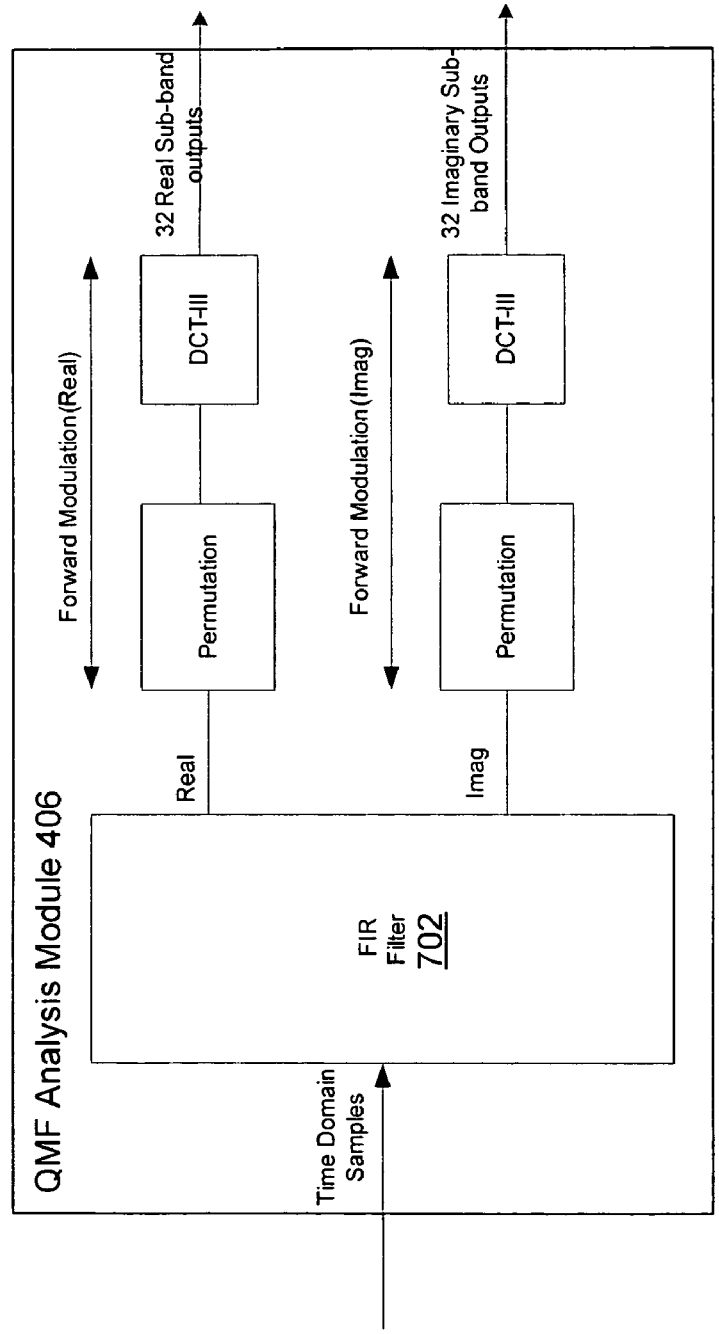
FIG. 7 is a graphical representation of the QMF analysis module in an embodiment of the present invention.

FIG. 6 is a graphical representation of the QMF analysis filter using the relationship between DCT3 and DCT4 in an embodiment of the present invention. Hence, the QMF analysis module 406 can be depicted as FIG. 7. FIG. 7 is a graphical representation of the QMF analysis module 406 in an embodiment of the present invention.

1024 time domain samples that are output from the core codec decoder 402 (e.g., AAC Decoder) may be analyzed by a 32-channel QMF analysis module 406. Further, the output of the QMF analysis module 406 may be 32×32 and complex (a real value may be output for low complexity). The input time domain samples may be in fractional 16 format q.15 format. Further, in a Polyphase implementation, 32 parallel complex 5-tap finite impulse response (FIR) filters for each channel (i.e. 64 FIRs in all—32 Left, 32 Right) may be used.

In exemplary embodiments, the analysis FIR filter 702 of the QMF analysis module 406 outputs 32 real and 32 imaginary values which may be subject to a permutation operation as defined below:

---

Forward Modulation (Real)

$u'(n) = u[48]$ when n = 0

$\quad = u[n + 48] + u[48 - n]$ when n = 1, 2, ... 15

$\quad = -u[n - 16] + u[48 - n]$ when n = 16, 17 ... , 31

(Imaginary)

$u'(n) = -u[16] >> 2$ when n = 0

$\quad = -(u[16 - n] >> 2 + u[16 + n] >> 2)$ when n = 1, 2 ... 15

$\quad = (u[48 - n] >> 2 - u[16 + i] >> 2)$ when n = 16 ... 31 u can be partitioned as:

u0- lower 16 real valued outputs. Real output from FIR 16-31
u1- upper 16 real valued outputs. Real output from FIR 0-15
u2- lower 16 imaginary valued outputs. Imaginary output from FIR 16-31
u3- upper 16 imaginary valued outputs. Imaginary output from FIR 0-15

---

If these values are stored in different banks of memory or in a multi-port register file, then parallel operations may be possible.

The discrete cosine transform III is as follows:

$$X_k = \frac{1}{2}x_0 + \sum_{n=1}^{N-1} x_n \cos\left[\frac{\pi}{N}n\left(k + \frac{1}{2}\right)\right] k = 0, \ldots, N-1$$

The discrete cosine transform III can be implemented directly using the formula above, but in order to reduce the complexity to be of order O(nlogn), it may be implemented with a fast Fourier transform (FFT) with O(n) pre-processing steps.

Analysis QMF bank processes the time domain-input samples and converts them into the spectral domain. The HF generator 408 then processes data in the spectral domain. For example, the HF generator 408 organizes the data in the spectral domain as slots, where each slot represents up to 64 bands of complex data, which can be considered as a two-dimensional matrix X[slot][band], where the columns represent the frequency bands and the rows represent the timeslots in each frequency band.

During the analysis QMF processing by the QMF analysis module 406, 32 time domain samples from perceptual audio decoder may be transformed into a slot of 32 complex spectral band values. From an audio frame of 1024 time domain samples, 32 such time slot may be created, which is referred to as the low band represented by $X_{LowBand}[32][32]$. The HF generator 408 reconstructs (also called patching) the remaining 32 spectral bands based on the low band data and patching data (i.e., SBR data). The patching data controls the number of patches, start-band, and number-of-bands for each patch.

In short, the HF generator 408, transforms the $X_{LowBand}$[32] [32] matrix into a matrix, X[64][64].

Based on the SBR data, the spectral envelope module 412 may modify the high band to adjust the tonal-to-noise ratio and time-frequency resolution. Further, the spectral envelope module 412 can compute the energy of the individual higher frequency bands and compare these values with the reference energies conveyed in the SBR data. The high band signals are then adjusted to the desired values depending on whether amplification or attenuation is needed.

Spectral shape of the energy can be changed many times per frame which is represented as envelopes. An envelope is a set of energy values corresponding to a certain range in time, which contains the reference energy values for each sub-band. The time-frequency grid part of the SBR data describes the number of SBR envelopes and noise floors as well as the time segment associated with each SBR envelope and noise floor. Noise envelopes are transmitted for sub-bands where noise should be generated at a specified reference energy, instead of transposing the low bands. In some embodiments, synthetic sines are generated in some sub-bands when the signal has very high tonal components.

In some embodiments, to allow flexible alignment of envelopes across frame boundaries, the last six slots from the previous frame may be used in the envelope adjustment process. The signal energy may be estimated based on the output of HF generator 408 for each envelope. Depending on the frequency resolution of the envelope, the energy may be calculated for each sub-band or each SBR band (one or more QMF sub-bands). From these energy values and the reference energy values extracted from the SBR data, the gain values and noise level for the sub-bands are computed. In order to avoid unwanted noise substitution, gain values can be limited. Furthermore, the overall level of each limiter band may be adjusted to compensate for the energy loss introduced by the limiting process. This boost or compensation is applied on all the gain values, noise-floor scale factors values and sinusoid levels. A smoothing filter may also be applied on the compensated gains to avoid sudden changes at the envelope borders. These compensated gain values and noise levels may be applied to all the time slots of the current envelope. The complex sub-band values can be multiplied by the gains or random noise with calculated levels can inserted depending on the envelope.

Those skilled in the art will appreciate that tonal characteristics may be different at different frequency ranges of the spectrum. As a result, audio artifacts can occur if the tonal characteristics are not reconstructed correctly during the higher frequency band generation. Some of these artifacts cannot be removed by using just the spectral envelope module 412 (which is described below). As a result, adaptive inverse filtering may be performed on each reconstructed high-band to reduce these artifacts.

Inverse filtering may be based on a second order linear prediction linear prediction coefficients may be computed independently from the low band data using a covariance method. As the sub-band signals are in a complex domain, computation of the linear prediction coefficients and filtering are performed in the complex domain. The amount of prediction may be adjusted by applying a bandwidth expansion to the linear prediction coefficients. A bandwidth expansion factor may be controlled by the parameters in the input bit stream.

Figure 8:
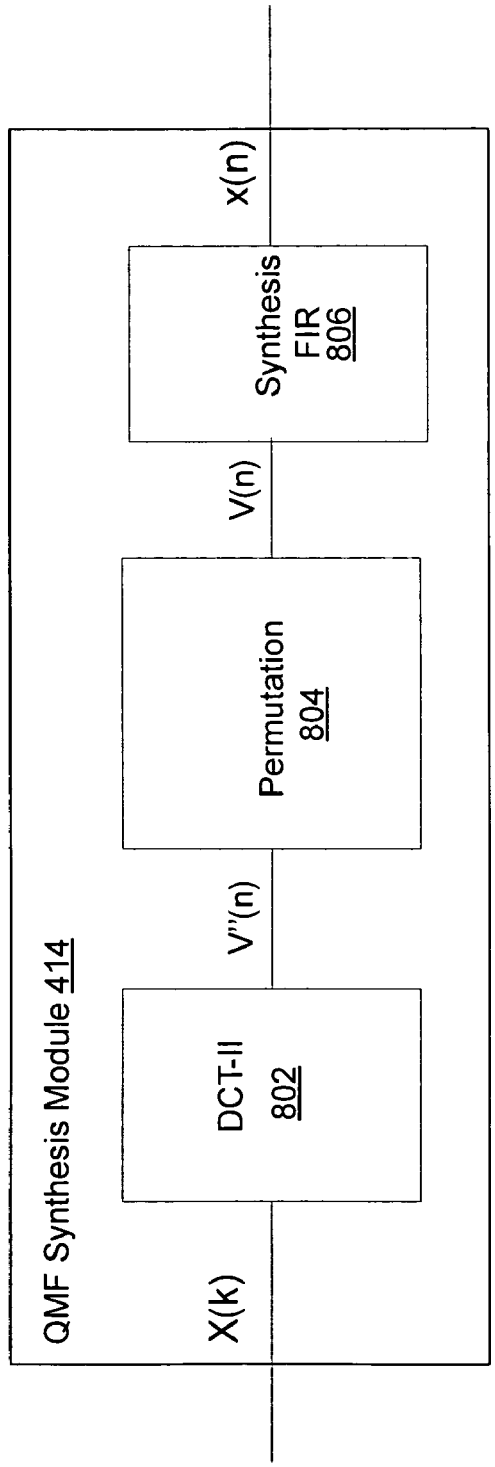
FIG. 8 is a graphical representation of the QMF synthesis module in an embodiment of the present invention.

In some embodiments, the time domain output may be synthesized from low band and high band with an N channel QMF synthesis module 414 which may be implemented as a DCTII, permutation and N parallel complex FIR (M-Tap Filters). In an exemplary case of AACPlus, M=5, N=64. FIG. 8 is a graphical representation of the QMF synthesis module 414 in an embodiment of the present invention.

The discrete cosine transform II (DCTII) 802 may be represented as $$X_k = \sum_{n=0}^{N-1} x_n \cos\left[\frac{\pi}{N}\left(n + \frac{1}{2}\right)k\right] \quad k = 0, \ldots, N-1$$

The discrete cosine transform II 802 can be implemented directly using the formula above, but in order to reduce the complexity to be of order O(nlogn), it may be implemented with a fast Fourier transform (FFT) with O(n) post processing steps.

The permutation 804 operations are very similar to the permutations in the QMF analysis module 406:

```
v(n)=v"(32–n) n=0,1,..31
v(n)=v"(n–32) n=32,..95
v(n)=0 n=96
v(n)=–v'(160–n) n=97..127
qmfReal is the output of the DCT-II (v"(n))
qmfReal2 is the expanded output
qmfReal2[i]=qmfReal[32+i] i=0..31 for qmf2Real[0..31]
qmfReal2[64–i]=–qmfReal[32+i] i=1..31 for qmf2Real[33..62]
qmfReal2[32]=0
qmfReal2[63]=qmfReal[33]
qmfReal[32+i]=qmfReal[i] i=0..15 for qmfReal[32..47]=qmfReal[0..15]
qmfReal[31–i]=qmfReal[63–i] i=0..15
qmfReal[31..16]=qmfReal[63..48]
qmfReal[i]=qmfReal[32–i] i=0..15 qmfReal[0..15]=qmfReal[32..16]
qmfReal[63–i]=qmfReal[32+i] i=0..15
qmfReal[63..48]=qmfReal[33..47]
```

Similar to the QMF analysis module 406, parallelism can be exploited.

The synthesis FIR filter 806 of the QMF synthesis module 414 may be implemented as a N parallel complex FIR filter (M-Tap Filters). The time domain output can be a 16-bit or 24-bit value. The input to the filter may be complex but the output may be real. The synthesis filter data values may be subsampled by a factor L. In the exemplary case of AAC Plus, M=5, N=64 and L=2. This may be a very computationally intensive operation, but, by exploiting the parallelism, it is possible to speed up the operation. The synthesis FIR Filter 806 may also data intensive as the parallel FIR filter and the subsampling may result in very large history buffer requirements.

FIG. 9a and FIG. 9b are tables displaying memory usage regarding complex values from the QMF analysis module 406 in exemplary embodiments. The FIR (Finite Impulse Response) filter 702 (see FIG. 7) of the QMF analysis module 406 can be very computationally expensive. The FIR history buffer and the FIR real and imaginary coefficients may be stored in different banks of the shared memory (e.g., register file 114, auxiliary register file 116, and/or shared memory 206) to achieve parallelism.

MAC units may perform the multiply and accumulation functions. In one example, two MAC units perform the multiplication functions and a third MAC performs the accumulation function. Those skilled in the art will appreciate that any number of MAC units (such as those associated with the hardware extensions 118) may perform the multiplication and accumulation functions within FIGS. 9a, 9b, 10a, and 10b. In one example, multiple MAC units are used in parallel.

In one example, the history buffer 902 is implemented as a nine deep circular buffer. The start within the circular buffer points to the oldest value in the history buffer which is replaced with a new value and an oldest value pointer is incremented by 1 modulo of the history buffer size after each FIR operation.

Since the analysis QMF filter may be implemented as 32 parallel FIR filters, the increment may be performed when all 32 FIR filter operations have been executed. The even locations in the buffer starting from the start pointer may be multiplied by real coefficients and the odd locations may be multiplied by imaginary coefficients. The new value may replace the value in the history buffer 902.

The analysis FIR filter 702 hardware may use four 16×16 MAC (multiply-accumulate unit) every cycle. Those skilled in the art will appreciate that the 16×16 MAC may not operate every cycle due to alignment issues with the history buffer 902. In one example, the values in the history buffer 902 are real and three banks of shared memory may be needed for the real history buffer and the complex FIR coefficients. In some embodiments, the history buffer 902 is replicated on two banks of memory with the shared memory for increased parallelism.

In an example, the FIR0 Val0 is the oldest value in the nine deep circular buffer corresponding to the FIR0. In this example, the FIR0 Val[1-8] correspond to the other eight entries in the history buffer. Here, Accum0 and Accum1 correspond to the real and imaginary outputs of the Analysis FIR filter:

```
Real Output
    Accum0 =val0 * Real_coeff4
    Accum0+=val2 * Real_coeff3
    Accum0+=val4 * Real_coeff2
    Accum0+=val6 * Real_coeff1
    Accum0+=val8 * Real_coeff0
Imaginary Output
    Accum1=val1 * Imag_coeff4
    Accum1+=val3 * Imag_coeff3
    Accum1+=val5 * Imag_coeff2
    Accum1+=val7 * Imag_coeff1
    Accum1+=new_val * Imag_coeff0
```

Figure 10A:
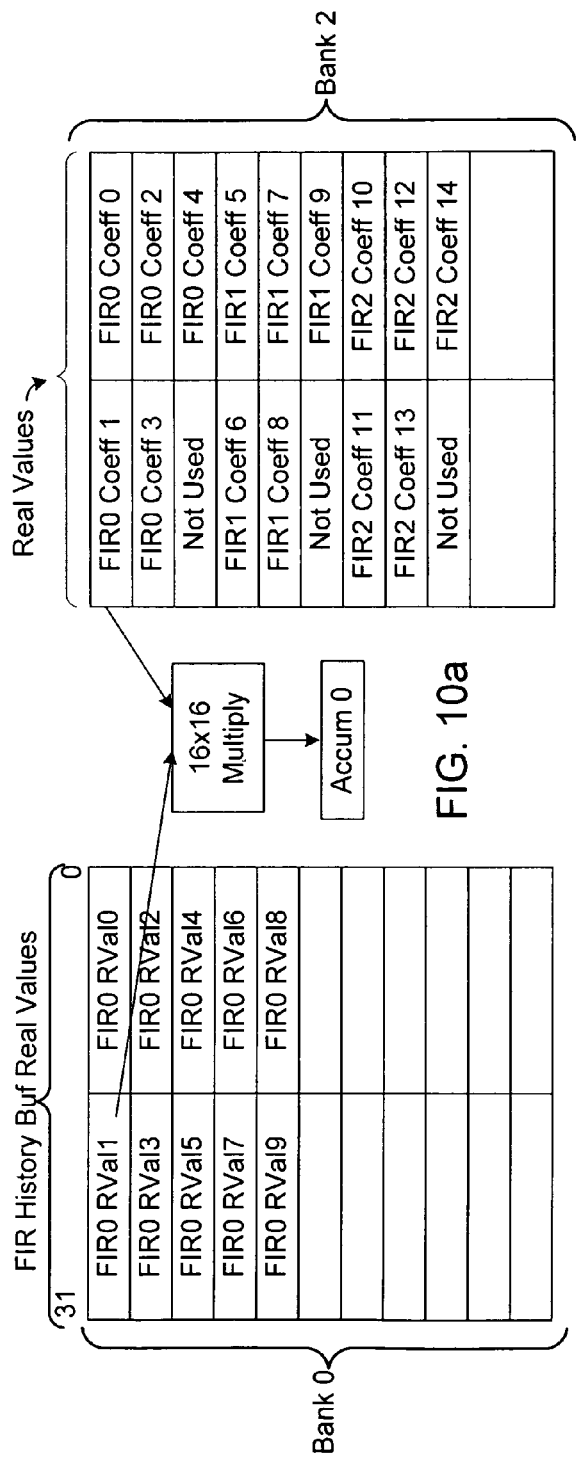
FIG. 10a and FIG. 10b are tables displaying memory usage regarding complex values from the QMF synthesis module in exemplary embodiments.
Figure 10B:
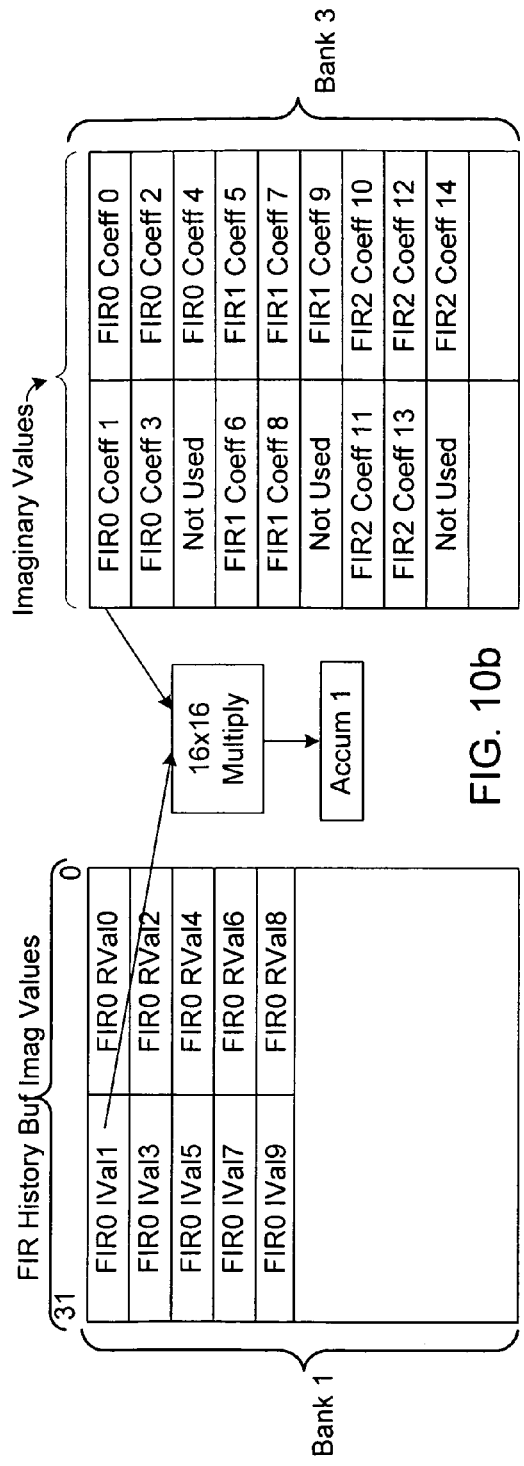

FIG. 10a and FIG. 10b are tables displaying memory usage regarding complex values from the QMF synthesis module in exemplary embodiments. The Synthesis FIR filter 806 of the QMF synthesis module 414 filters the high frequency reconstructed output after it has been converted to the time domain. This synthesis FIR filter 806 may include 64 FIR filters of order 5 in the exemplary case of AAC Plus. The output of the permutation 804 operation may be 32-bits. In order to reduce storage, the new real and imaginary values which are 32-bits can be converted to 16-bit values before they are placed in the history buffer 902.

Once the history buffer 904 is updated with new values, the synthesis FIR filter 806 operation may be performed. The new real and imaginary values replace the oldest data values which are specified by the FIFO_DATA_PTR. In an exemplary embodiment during the execution of the inverseModulationReal( ) function, the output of the permutation 804 operation is written to the real history buffer by taking a 32-bit value from an auxiliary register (e.g., auxiliary register file 116) and writing out a 16-bit value to the history buffer 902 at the location derived from the FIFO_DATA_PTR (oldest data value) and FIR Number. This may be accomplished for all of the FIRs. Subsequently, the same operation may be performed in the inverseModulationImag( ) function for the new imaginary values. After this, the FIFO_DATA_PTR field is incremented.

In exemplary embodiments, the synthesis FIR filter 806 accumulates the real and imaginary values separately and then combines the accumulated values to produce a 16-bit pulse code modulation (PCM) sample. The number of multiplications per cycle may be limited by the organization of the history buffer 902. To achieve maximum throughput, the organization of the history buffer 902 may be based on a downsampling factor. In one example, this occurs so that the four source values may be available from the history buffer 902 every cycle—two real and two imaginary. This can be achieved by having the sample[x] and sample[x+down-_sample_factor] in the same 32-bit word. In the exemplary case when downsample_factor=2, every other new sample is in the same 32-bit word.

The permutation operations (see FIG. 7) for analysis QMF filtering may comprise scaling the input values and addition/subtraction. For synthesis filtering, permutation 804 operations may involve copying and rearrangement of the data. If input and output data are available in the shared memory, these operations can be accelerated with multiple read/write ports. The scaling operations may be performed in the source and destination control units.

In some embodiments, one of the efficient ways of implementing DCTs is to use complex fast Fourier transforms (FFTs). An N-point DCT can be implemented as real part of an N point real FFT using a N/2 complex FFT. This may require reordering either the input or output and pre/post twiddling. In one example, the pre/post twiddling operations preformed for the complex FFT computation is a follows.

```
Y_R[0] = X_R[0]
Y_I[0] = X_I[0]
Y_R[N] = X_R[N]
Y_I[N] = X_I[N]
for( k=1; k < N/4)
{
    a1 = X_R[k] + X_R[N/2-k]
    a2 = XI[k] + XI[N/2-k]
    a3 = X_R[N/2-k] - X_R[k]
    a4 = XI[k] - XI[N/2-k]
    a5 = (a2 * cosphi[k] ) + (a3 * sinphi[k]);
    a6 = (a2 * sinphi[k]) - (a3 * cosphi[k]);
    Y_R[k]      = a1 + a5;
    Y_I[N/2-k]  = a1 - a5;
    Y_R[k]      = a6 - a4;
    Y_I[N/2-k]] = a6 + a4;
}
``` where X is the complex input to the twiddling operation and Y is the complex output. Cosphi and sinphi are the twiddle factors. N is the length of the DCT. In some embodiments, this operation can also be performed in-place.

The second twiddling operation is shown below:

```
for (k=0;k < N/2;k++)
{
    xr= X[k]
    xi=X[N-k];
    Y[2*k]=xr*cosphi[k]+xi*sinphi[k];
    Y[2*k+1]=xi*cosphi[k]-xr*sinphi[k];
}
```

As can be observed from the above equations, the basic operations are multiplications and accumulations. In exemplary embodiments, X and Y are stored in a shared memory or shared register (e.g., register file 114, auxiliary register file 116, and/or shared memory 206). The sine and cosine table can be accessed from the ROM tables 120. The four multiplications may be mapped to the four multiply units and accumulators (MACs) (e.g., the MACs associated with the hardware extensions 118). In exemplary embodiments, the operations inside the loop can be performed with a throughput of one every cycle.

During the computation of the DCT, the output one stage may feed the next stage. Once the output of the reordering stage is available in the register file, the complex FFT computation and the first twiddling operations can be performed in-place.

There is a slight-difference in the order for DCT II (used in synthesis QMF) and DCT III (used in analysis QMF). However, in various embodiments, the basic operations are the same.

The Cooley-Tukey FFT algorithm, recursively breaks down a DFT of composite size n=rm into r smaller transforms of size m where r is the "radix" of the transform. These smaller DFTs are then combined with size-r butterflies, which themselves are DFTs of size r (performed m times on corresponding outputs of the sub-transforms) pre-multiplied by roots of unity (known as twiddle factors). This is called the decimation in time.

Figure 11:
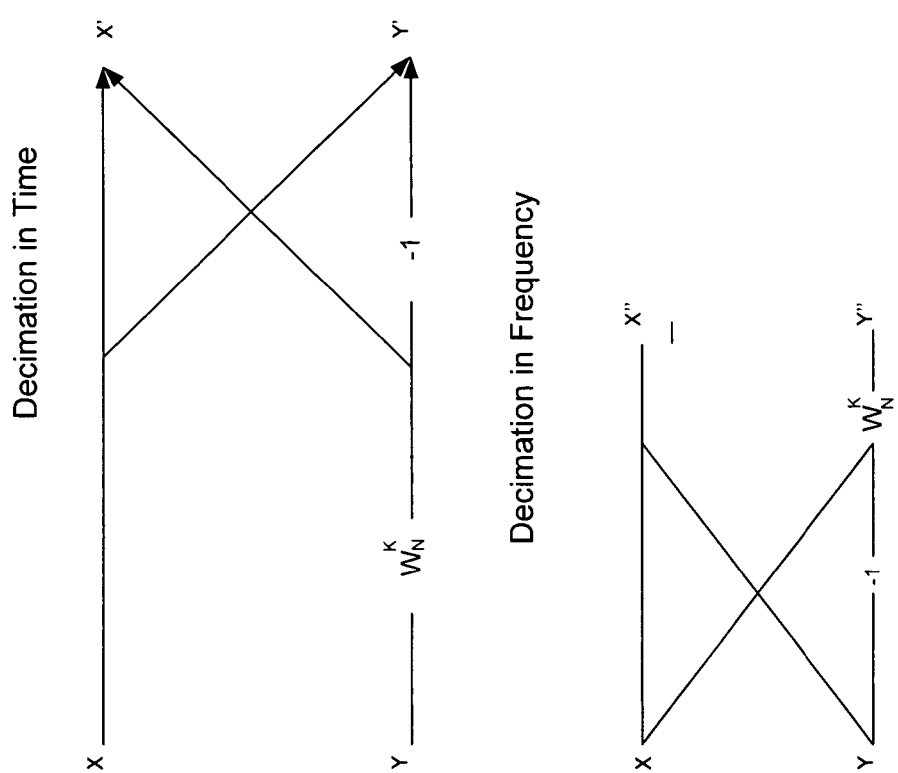
FIG. 11 is a graphical representation of "decimation in time" and "decimation in frequency" in an exemplary embodiment of the present invention.

One can also perform the steps in reverse, known as "decimation in frequency," where the butterflies comes first and are post-multiplied by twiddle factors. FIG. 11 is a graphical representation of "decimation in time" and "decimation in frequency" in an exemplary embodiment of the present invention. In the case of the radix-2 Cooley-Tukey algorithm, the butterfly is simply a DFT of size 2 that takes two inputs (X,Y) and gives two outputs (X',Y'). In an exemplary embodiment, the FFT Butterfly operation is accelerated. Either the DIT_BFLY or the DIF_BFLY can be accelerated. The twiddle factor can be obtained from the Sine Cosine table in the ROM table 120. The sources and destination can be accessed using the bit reverse addressing using the mode in the source and destination control units. In another exemplary embodiment, the twiddle index pointer can be auto-incremented by a programmable step after each butterfly operation to further improve performance.

In one preferred embodiment, two inputs (X,Y) and two outputs (X',Y') can be organized in the register file (e.g., register file 114, auxiliary register file 116, and/or shared memory 206), where the computation can be in-place. In one example, for smaller FFT lengths, the register file size can be kept minimal. Having multiple read/write ports and increasing the number of multipliers, butterfly operation for radix-4 or higher can be performed very efficiently. Having a very efficient implementation for smaller FFT lengths may allow an optimal implementation of higher FFT lengths as well. An FFT of larger length can be computed from smaller FFTs and post-twiddling.

Having shorter FFT lengths also makes the implementation of the bit-reversal addressing easier. Performing the bit-reversal operations in-place for the complex data may not be very straight forward. However, for smaller FFT lengths, this can be implemented using a table-lookup where the addresses are precomputed in the ROM table 120. In one of the various embodiments, for a 32-point FFT, only 12 operations are needed to do the bit-reversal operations in place.

The IMDCT transform can be rewritten as:

$$Y_k = 2w[n]\text{Re}\left(e^{j\Pi/N(n+n0)} \frac{1}{N}\left(\sum_{k=0}^{N-1}(X(k)e^{j2\Pi/Nkn0})e^{j2\Pi/Nkn}\right)\right)$$

Where w[n] is the window function, $n_0=(N/2+1)/2$, and Re-represents taking the real part of a complex number The IMDCT can be implemented as:
1. Pre-twiddle the frequency samples with factor $e^{j2\pi/Nkn0}$
2. Perform a N point FFT on the pre-twiddle data
3. Post twiddle the inverse transform data by taking the real part of the inverse transformed data with the factor $e^{j\Pi/N(n+n0)}$
4. Multiply with two times the synthesis window (either a Kaiser Bessel Derived window or a sine window)
5. Overlap and add with the previous windowed N-M values where M=N/2
6. Output N/2 output buffer samples to the decoder output stream In various embodiments, these operations can be accelerated with hardware previously defined. The pre-twiddle is identical to one of the DCT twiddle operations and FFT post twiddle is very similar to the other DCT twiddle operation the only difference being the use of sine window table instead of sine/cosine table.

In exemplary embodiments, there are four 32×16 multipliers (e.g., MAC units) and a multiport register file (e.g., register file 114, auxiliary register file 116, and/or shared memory 206) that can be used to accelerate FIR and IIR filters. In exemplary embodiments, the coefficients and history buffer 902 is stored in an auxiliary register file (e.g., auxiliary register file 116). The value stored in the history buffer 902 may be different for the FIR filter and the IIR filter. In various embodiments, stored values are controlled by software which calls an instruction which loads a value in a location pointed to by the oldest data pointer. After executing the instruction, the oldest data pointer increments by 1. In some embodiments, the oldest data pointer is modulo counter (order of the filter, which is programmable). Even though the order of the filter can be any value, the number of coefficients may be padded to be a multiple of 4, and the padded coefficients set to 0. This may be done because the filter operation may be performed by calling a quad-MAC instruction. The result from the filter operation may be obtained by calling a filter result instruction.

Figure 12:
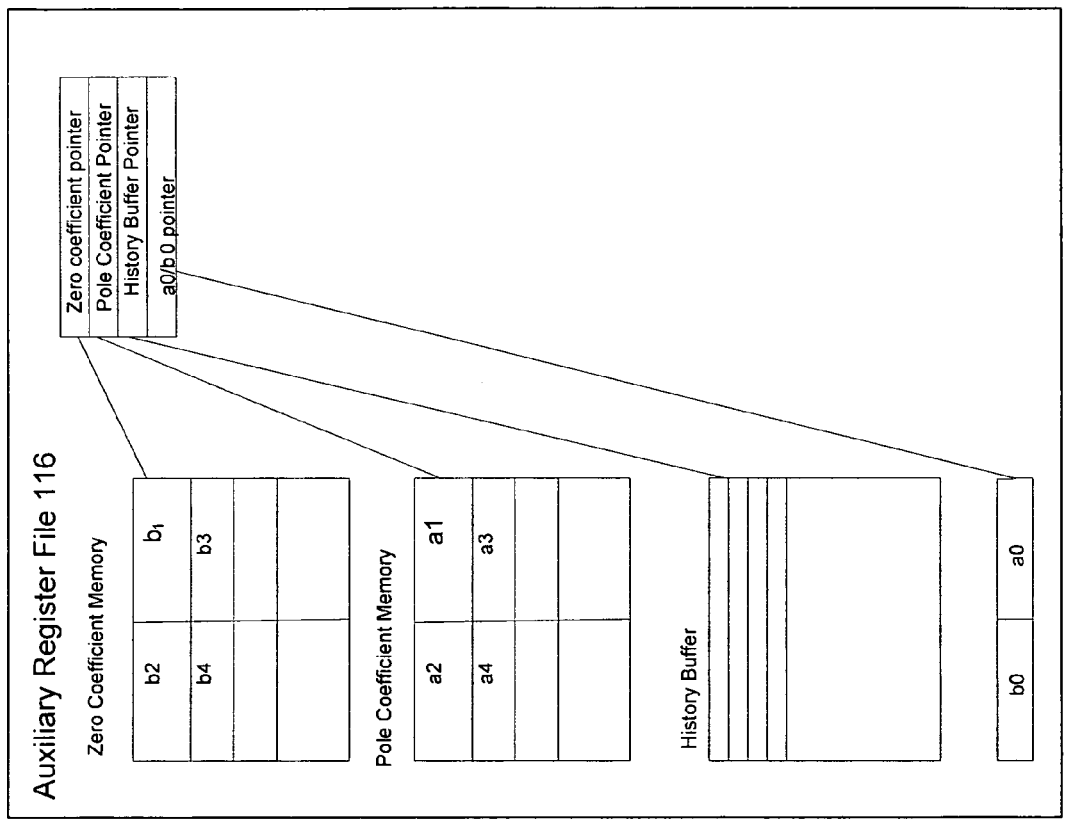
FIG. 12 is a graphical representation of an auxiliary register file is an exemplary embodiment of the invention.

FIG. 12 is a graphical representation of an auxiliary register file in an exemplary embodiment of the invention. In various embodiments, rather than clearing the history buffer 902, performance may be improved not clearing the history buffer 902. In one example, a bitmask is used with a bit indicating whether the location in the history buffer 902 has a valid. Bit 0 may map to the location oldest_history_pointer+1 and bit 31 may map to location oldest_history_pointer+31. When the bitmask bit is 0, the the value in the history buffer 902 may be ignored and a 0 is output to the quad-MAC during the filter operation.

FIR Filter Result $Y(n) = a_0*x(n) + a_1*x(n-1) + a_2*x(n-2) + a_3*x(n-3) + a_4*x(n-4)$ // Compute $\sum_{k=1}^{M} a_k x(n-k)$ and store result in accu0

Execute the filter_res instruction to get result of FIR Filter

IIR Filter Result

Implemented as Direct-Form II IIR Filter Structure
Example : $6^{th}$ order filter
$v(n) = a_0x(n) - a_1*v(n-1) - a_2v(n-2) - a_3v(n-3) - a_4v(n-4) - a_5v(n-5) - a_6v(n-6)$
$y(n) = b_0v(n) + b_1v(n-1) + b_2v(n-2) + b_3v(n-3) + b_4v(n-4) + b_5v(n-5) + b_6v(n-6)$ Compute $\sum_{k=1}^{M} a_k v(n-k)$ and store result in accu1

Compute $\sum_{k=1}^{N} b_k v(n-k)$ and store result in accu0

Execute the filter_res instruction to get result of IIR Filter

---

In various embodiments, an inverse temporal noise shaping filter is a 12/20 tap all pole filter accelerated using the hardware in FIG. 1-3 to implement the FIR and IIR filter. This may be implemented as a Direct Form IIR implementation:

$$Y(n) = \sum_{i=0}^{M} b_i x(n-i) - \sum_{j=1}^{N} a_j y(n-j)$$

In an all pole filter $b_1, b_2, \ldots b_M = 0$:

$$Y(n) = b_0 x(n) - \sum_{j=1}^{N} a_j y(n-j)$$

Two computational intensive parts of the HF generator 408 (see FIG. 4) are the computation of the complex autocorrelation coefficients and the complex linear predictive filtering. Autocorrelation values may be calculated for each sub-band from the low-band complex spectral signals and overlap values from the previous frame. Before calculating the autocorrelation values, the input data may be scaled down to 16-bits to reduce the number of 32×32 bit multiplications. To exploit the dynamic range of the processor, a normalization of the input values may be performed prior to downscaling to lower data-width. The normalization scale factor may be computed by finding the maximum absolute value of the input data and counting the leading zeros. All the input values may be normalized based on this normalization factor. As mentioned above, the real and imaginary part of the complex low band values may be organized as a two-dimensional matrix X[slot][band] in the analysis QMF filter. The low band samples and the overlap values may not have some scale factors associated with them so finding the absolute maximum value of these values may involve prescaling of these values before further processing. Moreover, the processing can be done column-wise (for each band).

As the autocorrelation computation may be done for each sub-band, the two-dimensional X[slot] [band] may be converted to X'[slot] before further processing. In one exemplary embodiment, the source/destination control block may have special addressing modes and input re-scaling logic to accelerate column-wise processing of the complex input values. On a RISC processor or a DSP processor, column-wise accessing of a two dimensional array with scaling can be expensive because of the indirect addressing.

Shared memory (e.g., register file 114, auxiliary register file 116, and/or shared memory 206) with a multiple-read/write port can speed up the memory access of the complex input values, finding the absolute maximum values of the prescaled values and storing the rescaled values for each sub-band into a one-dimensional array in the register file. If the rows of the two-dimension array are stored in the consecutive blocks, then the addressing of the column elements can be accomplished efficiently with the source and destination control block, if the row-size is known.

The operations performed in computing the autocorrelation values may be as follows:

$$\Phi(i,j) = \sum_{n=0}^{Slots+OverLap} X(n-i) \cdot \overset{*}{X}(n-j)$$

Which translates 4 multiplications. For $i \neq j$, $$\Phi_r = X_{rCur}*X_{rPre} + X_{iCur}*X_{iPre}$$

$$\Phi_i = X_{iCur}*X_{rPre} - X_{rCur}*X_{iPre}$$

where $\Phi_r$ and $\Phi i$ refers to the real and imaginary part of the intermediate complex autocorrelation values values $X_{rCur}$, $X_{iCur}$, $X_{rPre}$ and $X_{iPre}$ are real and imaginary parts of current and previous values.

For $i=j$, only the real part needs to calculated. In one exemplary embodiment, the real and imaginary values of X can be stored in adjacent locations in the register file after resealing and normalizations. In one example, with four read ports, two write ports, and four multipliers, intermediate accumulation of complex autocorrelation can be accomplished in single cycle. If the result of the resealing and normalization can be written into the register file, there may be no overhead in copying the values into the register file.

The complex high bands may be regenerated from the complex low band values with linear prediction as in the following equation:

$$X_{high}(k)=X_{Low}(k)+\alpha_0 X_{Low}(k-1)+\alpha_1 X_{Low}(k-2)$$

where k is the regenerated time slot. The computation is done in the complex-domain. The translates into the following operations for real and imaginary value of $X_{high}$:

$$X_{rHigh}=X_{rLow}(k)+\alpha_{0r}*X_{rLow}(k-1)-\alpha_{0i}*X_{iLow}(k-1)+\alpha_{1r}\cdot X_{rLow}(k-2)-\alpha_{1i}*X_{iLow}(k-2)$$

$$X_{iHigh}=X_{iLow}(k)+\alpha_{0r}*X_{iLow}(k-1)+\alpha_{0i}*X_{rLow}(k-1)+\alpha_{1r}\cdot X_{iLow}(k-2)+\alpha_{1i}*X_{rLow}(k-2)$$

With $X_{rHigh}$, $X_{iHigh}$, $X_{rLow}$ and $X_{iLow}$ in shared memory, LPC coefficients and previous two history values of $X_{rLow}$ and $X_{iLow}$ in the register file, the computation of $X_{rHigh}$ and $X_{iHigh}$ can be calculated with a multiplier unit with four multipliers. Along with the multiplications, the filtering memory can also be updated in parallel in a circular manner.

As in the HF generator 408, input values of the spectral envelope adjuster module 412 may be normalized before computing the energies to exploit the dynamic range of the core processor 102. Depending on the frequency resolution of the envelopes, the energy estimation may be done on a sub-band basis or on an SBR-band basis. In either case, it may be necessary to find the absolute maximum of the input complex values and rescale the input values based on the normalization factor before computing the energy estimates. This involves traversing a two-dimensional array of complex input values.

Shared memory with two read ports, a source-destination control block with scaling logic and addressing modes to traverse two-dimensional array can accelerate the above mentioned normalization and rescaling efficiently.

In one example, energy computation involves squaring and accumulating the real and imaginary values. Directing the output of the rescaling algorithm to the multi-port register file (e.g., register file 114, auxiliary register file 116, and/or shared memory 206), the energy computation can be implemented utilizing the 4-multiplier units in the multiplier block.

In various embodiments, the actual gain adjustment involves processing the complex sub-band samples based on the computed gain values. Sinusoid generation or noise floor adjustment may also be performed. In an exemplary embodiment, saving the complex sub-band values in the shared memory and gain values in the register file can enhance the data-bandwidth requirement to keep up with the multiplier units.

Figure 13:
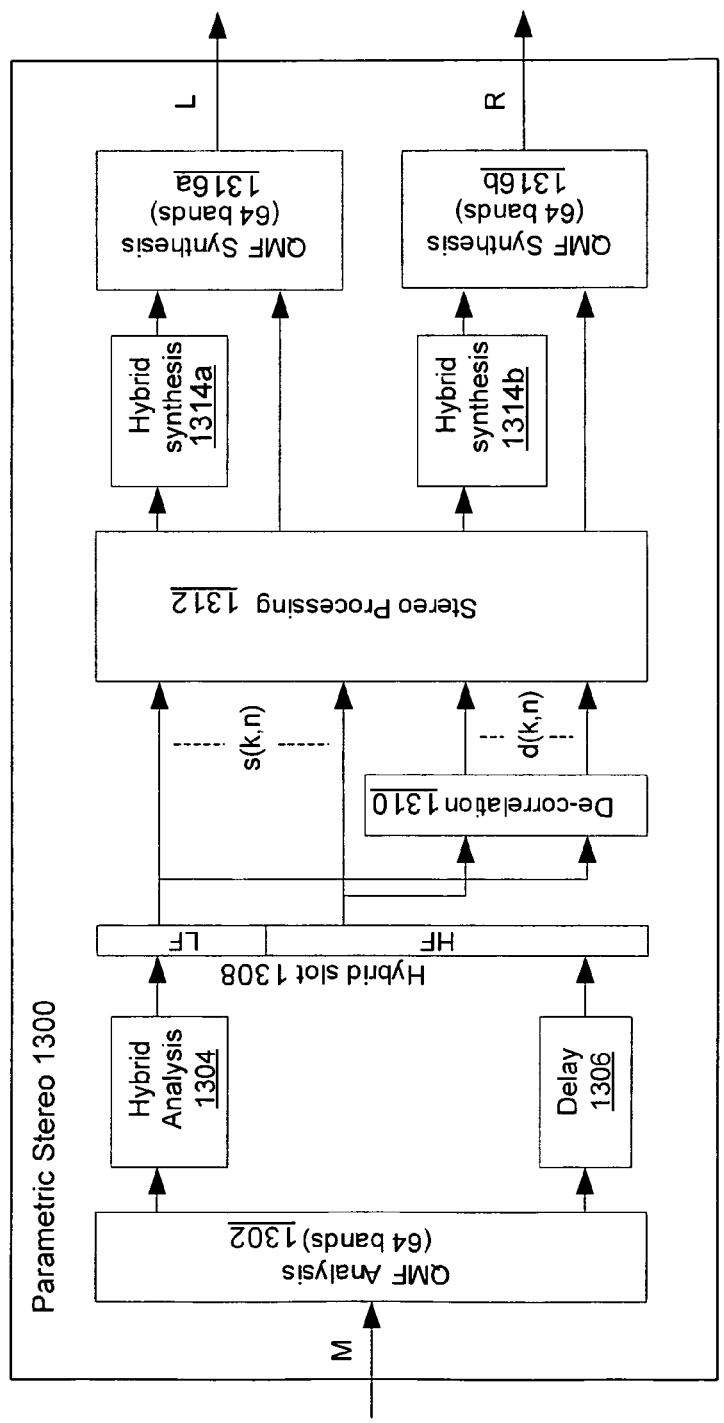
FIG. 13 is a block diagram depicting a parametric stereo in an embodiment of the present invention.

FIG. 13 is a block diagram depicting a parametric stereo in an exemplary embodiment of the invention. Parametric stereo is an efficient technique to recreate the left and right channels at the decoder from a monophonic signal and a small amount of control information. The stereo image is represented in the following parameters:

The inter-channel intensity difference, or IID, defined by the relative levels of the band-limited signal The inter-channel and overall phase differences, IPD and OPD, defining the phase behavior of the band-limited signal The inter-channel coherence ICC, defining the (dis)similarity of the left and right band-limited signal.

Figure 14:
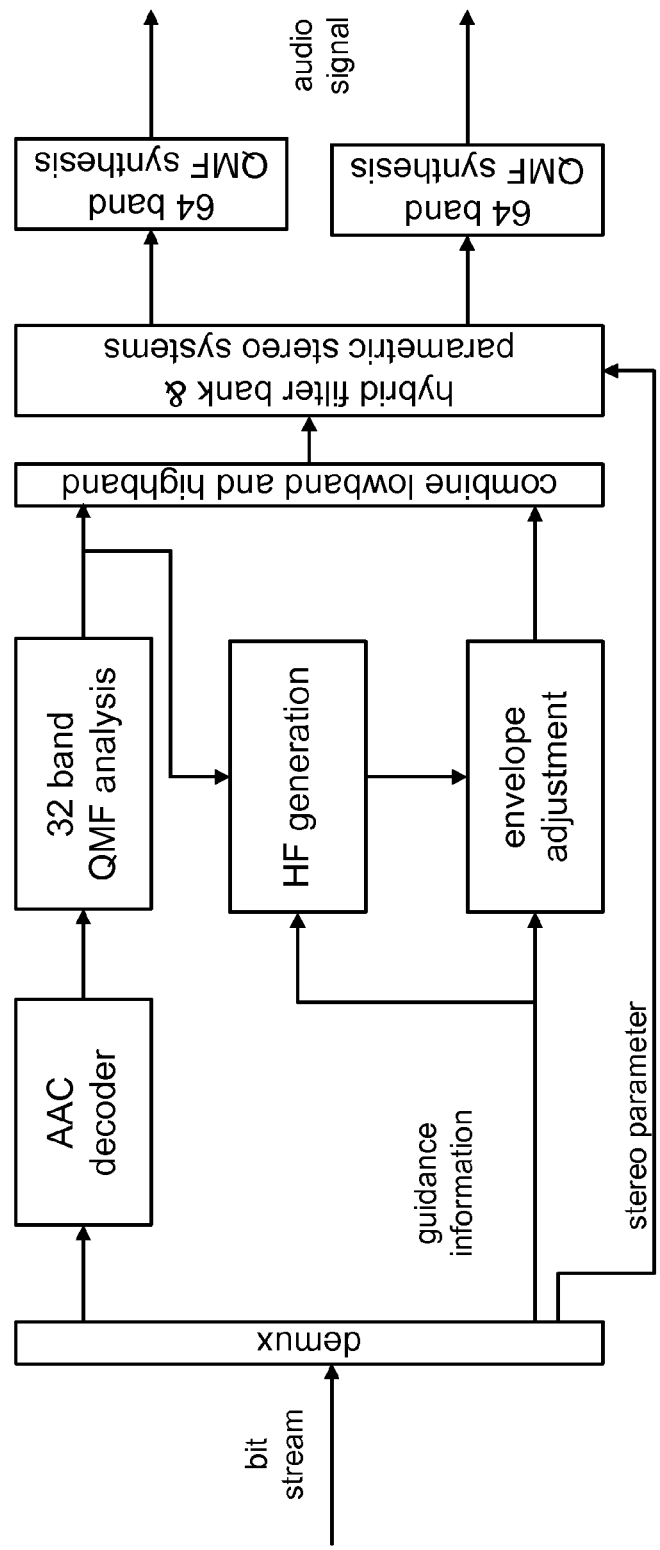
FIG. 14 is a block diagram of a parametric stereo decoder in an embodiment of the present invention.

FIG. 14 is a block diagram of a parametric stereo decoder in an embodiment of the present invention. At the decoder, these parameters are used to recreate the stereo image from the monophonic signal.

In a system where both SBR and parametric techniques are used, significant reduction in computational complexity can be achieved by reusing some of the commonly used blocks such as QMF filterbanks. As both tools operate on the QMF domain, parametric stereo can be performed on the combined 64 QMF sub-bands from Core Decoder and High Frequency Generation/Envelope Adjuster.

The human ear is more sensitive to stereo images at the lower frequencies. To improve the frequency resolution at lower frequency bands, the hybrid analysis 1304 and QMF synthesis filters 1316a and 1316b may be used. QMF analysis 1302 receives the signal. The high frequency component (and/or guidance information) is provided to the delay 1306 which provides the delayed signal to the hybrid slot 1308. The low frequency component undergoes hybrid analysis 1304 before being provided to the hybrid slot 1308. The hybrid slot 1308 provides the low frequency components and the high frequency components (or guidance information) to the stereo processing 1312 and the de-correlation 1310. After stereo processing, the left channel is generated and is sent through the hybrid synthesis 1314a and the QMF synthesis filter 1316a. Similarly, the right channel is generated and is sent through the hybrid synthesis 1314b and the QMF synthesis filter 1316b.

During the decorrelation 1310 process, a synthetic ambience channel is created using an all-pass-filter. A transient detector inside the decorrelator 1310 limits the amount of ambient to improve the transient properties. Both the output of the hybrid filter bank 1308 and the decorrelator 1310 output are used in the stereo reconstruction process. The left and right channel spectral values are reconstructed as a linear combination of decorrelator 1310 and hybrid filter bank 1308 outputs. The time-frequency variant coefficients for this operation are derived from the stereo parameters(IID, ICC) in the stereo processing 1312. The spectral values of the left and right channels are transformed into the time domain in QMF synthesis filters 1316a and 1316b, respectively.

The synthesis filtering is done on the reconstructed left/right channel as shown in FIG. 14. FIG. 14 is a block diagram of a parametric stereo decoder in an embodiment of the present invention.

The different steps in the parametric stereo processing may comprise hybrid analysis 1304 filtering, decorrelation 1310, upmixing of left/right channels, and hybrid synthesis filtering. In exemplary embodiments, hybrid analysis 1304 filtering is applied only for the only lower QMF bands, and for the rest of the bands delay 1306 is applied (depending the overall hybrid filter band delay). The frequency resolution of the hybrid filter band may depend on the number of stereo bands to be supported. An 8-point complex FFT may be computed in one of the configurations. Having the complex input signals in the register file with multiple read/write ports can accelerate this FFT computation very easily with a multiplier unit with four multipliers. Having access to the Sin/Cos Tables in the ROM (e.g., ROM tables 120) can allow the computation of the complex-butterfly operations efficiently. Hybrid analysis and synthesis may not be very computationally intensive compared to the other SBR modules, however, the availability of the data-bandwidth and access of the hardware resources are can be exploited, if needed.

Transient detection involves computation of the energies for the sub-bands. Even though the hybrid sub-band samples can be complex 32-bit words, the energy computation may be performed based on the most-significant 16-bits to reduce the number of double-precision multiplication. This involves scaling of the input values before the energy computation. If the scaled sub-band samples are available in the register file, the energy computations of complex values can be very efficiently done using all the four multipliers, as in the SBR. From the energy estimate, a transient gain adjustment factor may be computed to be applied after decorrelation 1310.

Decorrelation 1310 may be performed with a three-stage complex fractional delay all-pass first-order IIR Filter. In one example, the operations in each stage translate into:

```
Tempr  = HistReal * FdCoeffReal – HistImag *FdcoeffImag
Tempi  = HistReal * FdCoeffImag – HistImag * FdCoeffReal
Outr   = Tempr – Inr * decay;
Outi   = Tempi – Ini * decay;
HistReal = Inr + Outr * decay;
HistImag = Ini + Outi * decay;
```

Where Tempr and Tempi are the intermediate results, and HistReal and HistImag are the real and imaginary part of the filter history values. FdCoeffReal and FdCoeffImag correspond to the fractional delay filter coefficients. Inr, Ini, Outr and Outr are the input and output of each filter stage.

As the output of one-stage becomes the input of the next stage, only the history values may need to be written to the memory in each stage. With a 4-port shared memory (e.g., register file 114, auxiliary register file 116, and/or shared memory 206), all other parameters for the stage can be read and feed to the 4-multipliers to compute Tempr and Tempi. The remaining operations can make use of two multipliers and accumulators (MACs). With pipelining, the updating of history values; can be parallelized. The address update feature of the source and destination control units can allow address of the history and the coefficient values for each stage.

During upmixing, the input and decorrelated signals may be combined in a linear way to generate the left and right channels. In one example, the basic operation involved here is:

$$L(n)=H11*S(n)+H12*D(n)$$

$$R(n)=H21*S(n)+H22*D(n)$$

Where L and R refer to the left and right channels, S and D refer to the input to the Parametric Stereo processing and decorrelated signal. This translates to, in the complex domain:

$$L\text{Real}(n)=H11*S\text{Real}(n)+H12*D\text{Real}(n)$$

$$R\text{Real}(n)=H21*S\text{Real}(n)+H22*D\text{Real}(n)$$

$$L\text{Imag}(n)=H11*S\text{Imag}(n)+H12*D\text{Imag}(n)$$

$$R\text{Imag}(n)=H21*S\text{Imag}(n)+H22*D\text{Imag}(n)$$

With SReal, SImag, DReal, DImag being in the shared memory and coefficient in the register file, computation of LReal, LImag, RReal, and Rimag can be done with a 4-multiplier unit with accumulation.

Figure 15:
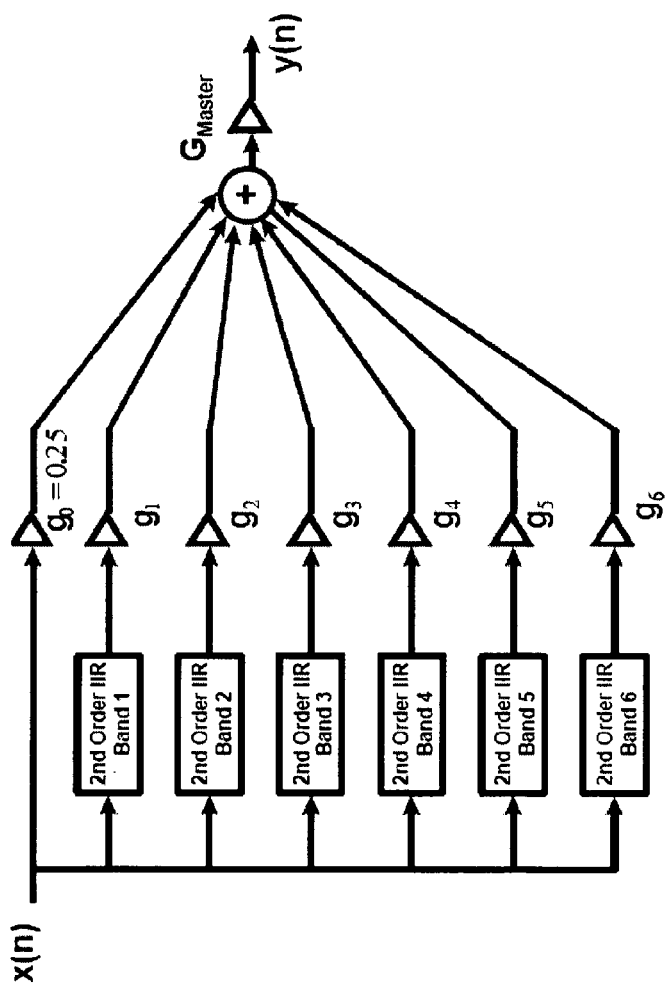
FIG. 15 is a graphical representation of a 6-band graphic equalizer in an exemplary embodiment of the present invention.

One of the commonly used audio post-processing techniques is the graphic equalizer. FIG. 15 is a graphical representation of a 6-band graphic equalizer in an exemplary embodiment of the present invention. In a graphical equalizer, the input spectrum in divided into different frequency bands and relative amplitudes in the different frequency bands are adjusted according to the gain settings in each frequency band.

One of the ways of implementing a graphic equalizer is to have N number of band-pass filters whose gains can be adjusted depending on the desired gain/attenuation selection.

One simple way of implementing a band pass filter is to use a $2^{nd}$ order Biquad section with a transfer function.

$$H(z) = g\frac{1+\beta_1 z^{-1}+\beta_2 z^{-2}}{1+a_1 z^{-1}+a_2 z^{-2}}$$

which can be implemented as:

$$v(n)=\alpha_0 x(n)-\alpha_1 v(n-1)-\alpha_2 v(n-2)$$

$$y(n)=\beta_0 v(n)+\beta_1 v(n-1)+\beta_2 v(n-2)$$

where x(n), v(n) and y(n) are the input, intermediate history and output values respectively.

This is very similar to the FIR/IIR/All Pole Filter accelerations discussed herein. In one exemplary embodiment, a minor extension is made to the accelerators to handle a biquad filter. The coefficients and history buffer 902 may be in the auxiliary register file 116, the computation of the output can be computed with the quad multiply units (MACs). Although the coefficients and history buffer 902 are described as within the auxiliary register file 116, those skilled in the art will appreciate that the coefficients and history buffer 902 may be within any shared memory including the register file 114 and the shared memory 206.

Figure 16:
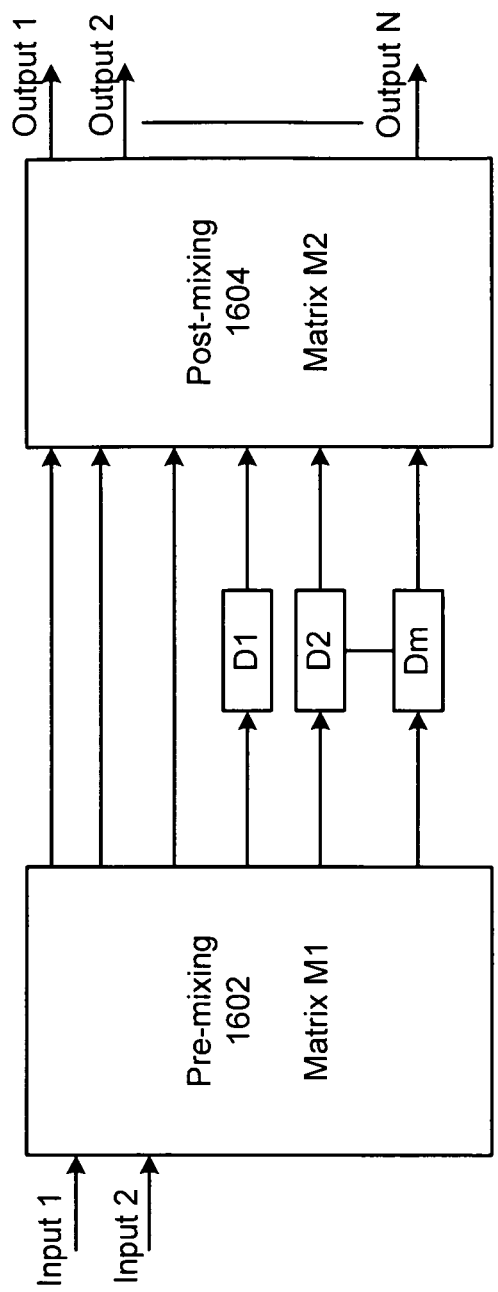
FIG. 16 is the general structure of audio processing at a decoder in an exemplary embodiment of the present invention.

FIG. 16 is the general structure of audio processing at a decoder in an exemplary embodiment of the present invention. MPEG surround is an open standard for compressing multi-channel audio signals broadly falls under Spatial Audio Coding (SAC). Spatial Audio Coding techniques may allow a transparent extension of traditional stereo or mono audio contents to multi-channels in a backward compatible manner keeping the overhead of bit-rate increase as minimal as possible. The basic concept in special audio coding is to transmit a down-mix signal and spatial image of the multi-channel audio signal as a compact set of parameters so that the multi-channel audio signal can be regenerated from the transmitted-down-mix signal and the spatial image information.

The input signals may be converted to the spectral domain using QMF filterbanks. The Upmixing process may comprise two stages namely premixing 1602 and postmixing 1604. Premixing 1602 process transforms the input signals to multiple channels using an upmixing Matrix M1, whose elements are controlled by the spatial parameters in frequency and time. Decorrelation module (D1, D2, . . . Dm) introduces the spatialness for each of the synthesized channels. The postmixing 1604 process combines the decorrelated and original signal using another matrix M2.

As can be noticed from the above diagram, this can be treated as an extension of the Parametric Stereo approach, where the basic operations involved the hybrid analysis/synthesis filtering, decorrelation, upmixing, etc. The same accelerations identified for parametric stereo can be applied in MPEG surround processing as well. There are more advanced temporal shaping tools in the MPEG surround. However, all the acceleration identified in the parametric stereo processing may apply as well. For example, Energy computation
Matrix processing (Upmixing)
Decorrelation (all-pass IIR filter)

Those skilled in the art will appreciate that it is also possible to use the architecture defined here to accelerate other surround processing systems The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A system for accelerating audio processing, the system comprising:
   a reconfigurable core processor that processes audio data received from system memory, and wherein the reconfigurable core processor is communicatively coupled to a register file and an auxiliary register file;
   a plurality of hardware accelerators, including multiply-accumulate (MAC) units executable to perform operations for accelerating the processing of audio data, the plurality of MAC units:
      coupled to the register file and the auxiliary register file, and
      sharing registers in each of the register file and the auxiliary register file with the reconfigurable core processor, and wherein the shared registers allow for parallel processing of audio data by the MAC units and the reconfigurable core processor;
   a source control unit that fetches operands for at least one of the plurality of MAC units from the shared registers; and
   a destination control unit that stores values derived by at least one of the MAC units in the shared registers, and wherein the derived values may be used to reconfigure an audio processing operation of the core processor.

2. The system of claim 1, wherein the reconfigurable core processor processes audio data using spectral band replication techniques.

3. The system of claim 1, wherein the reconfigurable core processor processes audio data using a fast Fourier transform.

4. The system of claim 1, wherein the reconfigurable core processor further processes audio data using a discrete cosine transform.

5. The system of claim 1, wherein the reconfigurable core processor further processes audio data using a discrete Fourier transform.

6. The system of claim 1, further comprising memory shared by the reconfigurable core processor and a coprocessor, the shared memory storing a plurality of instructions that may be executed in parallel.

7. The system of claim 6, wherein the one or more of the plurality of instructions are executable to perform QMF analysis related to spectral band replication or parametric stereo processing.

8. The system of claim 6, wherein the one or more of the plurality of instructions are executable to perform QMF synthesis related to spectral band replication.

9. The system of claim 6, wherein one or more of the plurality of instructions are executable to perform QMF synthesis related to parametric stereo.

10. The system of claim 1, further comprising computer executable instructions stored in memory and executable to perform the synthesis of modified high frequency components with low frequency components.

11. A system for accelerating the processing of audio data, the system comprising:
    a first memory storing a history buffer and a first plurality of finite impulse response filter coefficients;
    a plurality of execution units configured to execute in parallel, each of the plurality of execution units multiplying a first value from the history buffer and at least one finite impulse response filter coefficient from the first plurality of finite impulse response filter coefficients to generate a first result for performing QMF analysis;
    a second memory that stores the first result; and
    a reconfigurable processor that:
       receives the first result from the second memory,
       receives an instruction extension for performing a discrete cosine transform on the first result, and
       performs the discrete cosine transform on the first result in accordance with the execution of the instruction extension.

12. The system of claim 11, wherein the plurality of execution units include multiply and accumulate (MAC) units.

13. The system of claim 11, wherein the first memory stores instruction elements that may be executed in parallel.

14. The system of claim 11, wherein the QMF analysis is performed in spectral band replication.

15. The system of claim 11, wherein the QMF analysis is performed in parametric stereo.

16. The system of claim 11, wherein the QMF analysis is performed in audio equalization.

17. The system of claim 11, wherein the first memory further stores a second plurality of finite impulse response filter coefficients, and each of the plurality of execution units are further configured to multiply a second value from the history buffer and at least one finite impulse response filter coefficient from the second plurality of finite impulse response filter coefficients to generate a second result for performing QMF synthesis.

18. The system of claim 11, further comprising a ROM table that stores at least one of the first plurality of finite impulse response filter coefficients to the first memory.

19. A method for performing QMF analysis, the method comprising:
    receiving a first and a second time domain audio sample;
    retrieving a plurality of finite impulse response filter coefficients from memory;
    executing a hardware accelerators, including at least one multiply-accumulate (MAC) unit to multiply-accumulate the first time domain audio sample with a first finite impulse response filter coefficient of the plurality of finite impulse response filter coefficients and multiplying the second time domain audio sample with a second finite impulse response filter coefficient of the plurality of finite impulse response filter coefficients to generate a real result, wherein the multiply-accumulating of the first time domain and the multiplying of the second time domain occurs in parallel; and
    performing a discrete cosine analysis to output a real subband, the analysis occurring in accordance with execution of an instruction extension stored in memory and executed by a processor.

20. A system for accelerating audio processing, the system comprising:
    a reconfigurable processor that processes audio data;
    a hardware extension block to assist the reconfigurable processor in accelerating processing of audio data, the hardware extension block containing:

a first execution unit that executes custom processing, including multiply-accumulate operations related to the processing of audio data, a second execution unit that performs custom processing, including multiply-accumulate operations in parallel with the first execution unit;

a source control unit that fetches operands for at least one of the first or second execution units; and a destination control unit that stores values from at least one of the execution units.

21. The system of claim 20, wherein the reconfigurable core processor processes audio data using spectral band replication.

22. The system of claim 20, wherein the reconfigurable core processor processes audio data using a fast Fourier transform.

23. The system of claim 20, wherein the reconfigurable core processor further processes audio data using a discrete cosine transform.

24. The system of claim 20, wherein the reconfigurable core processor further processes audio data using a discrete Fourier transform.

25. The system of claim 20, wherein the first execution unit is a multiply and accumulate (MAC) unit.

26. The system of claim 20, wherein the second execution unit is a multiply and accumulate (MAC) unit.

27. A system for accelerating audio processing, the system comprising:

a general purpose RISC processor;

an audio co-processor communicatively coupled to the general purpose processor via shared register files and memory, wherein both processors processes audio data received from system memory, and wherein the audio co-processor includes a plurality of hardware accelerators including multiply-accumulate (MAC) units that are executable to perform operations for accelerating the processing of audio data, the plurality of MAC units:

coupled to the register file and the auxiliary register file, and sharing registers in each of the register file and the auxiliary register file with the general purpose RISC processor, wherein the shared registers allow for parallel processing of audio data by the MAC units and the audio co-processor, the processed audio data shared with the general purpose RISC processor.

28. The system of claim 27, wherein the audio co-processor processes audio data using spectral band replication techniques.

29. The system of claim 27, wherein the audio co-processor processes audio data using instruction extensions that accelerate processing of a fast Fourier transform.

30. The system of claim 27, wherein the audio co-processor further processes audio data using instruction extensions that accelerate processing of a discrete cosine transform.

31. The system of claim 27, wherein the audio co-processor further processes audio data using instruction extensions that accelerate processing of a discrete Fourier transform.

32. The system of claim 27, wherein the audio co-processor executes instructions to perform QMF analysis related to spectral band replication or parametric stereo processing.

* * * * *